United States Patent [19]
Masumoto et al.

[11] Patent Number: 5,490,006
[45] Date of Patent: Feb. 6, 1996

[54] LIQUID CRYSTAL LIGHT VALVE APPARATUS WITH A PAIR OF NON-PARALLEL PHASE DIFFERENCE PLATES

[75] Inventors: Yoshihiro Masumoto, Kobe; Hideki Ohmae, Suita, both of Japan

[73] Assignee: Matsushita Electric Industrial Co., Ltd., Osaka, Japan

[21] Appl. No.: 230,036

[22] Filed: Apr. 19, 1994

[30] Foreign Application Priority Data

Apr. 22, 1993 [JP] Japan .................................. 5-095839

[51] Int. Cl.⁶ ................................................ G02F 1/1335
[52] U.S. Cl. .................................. 359/73; 359/40
[58] Field of Search ........................ 359/40, 73

[56] References Cited

U.S. PATENT DOCUMENTS

| | | | |
|---|---|---|---|
| 5,150,235 | 9/1992 | Haim et al. | 359/68 |
| 5,189,538 | 2/1993 | Arakawa | 359/73 |
| 5,264,879 | 11/1993 | Skikama | 359/40 |
| 5,369,513 | 11/1994 | Akatsuka et al. | 359/73 |
| 5,375,006 | 12/1994 | Haas | 359/73 |

FOREIGN PATENT DOCUMENTS

| | | |
|---|---|---|
| 0272820 | 6/1988 | European Pat. Off. . |
| 0390511 | 10/1990 | European Pat. Off. . |
| 55-0600 | 1/1980 | Japan . |
| 62-133424 | 6/1987 | Japan . |
| 63-73782 | 4/1988 | Japan . |
| 3-71110 | 3/1991 | Japan . |
| 3116013 | 5/1991 | Japan . |
| 3-257424 | 11/1991 | Japan . |
| 5-19249 | 1/1993 | Japan . |
| 5-210084 | 8/1993 | Japan . |

Primary Examiner—Anita Pellman Gross
Assistant Examiner—Charles Miller
Attorney, Agent, or Firm—Panitch Schwarze Jacobs & Nadel

[57] ABSTRACT

In a liquid crystal light valve apparatus comprising an incident side polarizing plate, a twisted nematic liquid crystal cell of active matrix type and an outgoing side polarizing plate, two phase difference plates are provided between the incident side polarizing plate and the liquid crystal cell. Optical axes of both the phase difference plates are perpendicular with each other, and one of them is slanted by an angle, and thereby, a phase difference which is caused by the liquid crystal cell is compensated by the phase difference caused by two phase difference plates.

20 Claims, 22 Drawing Sheets

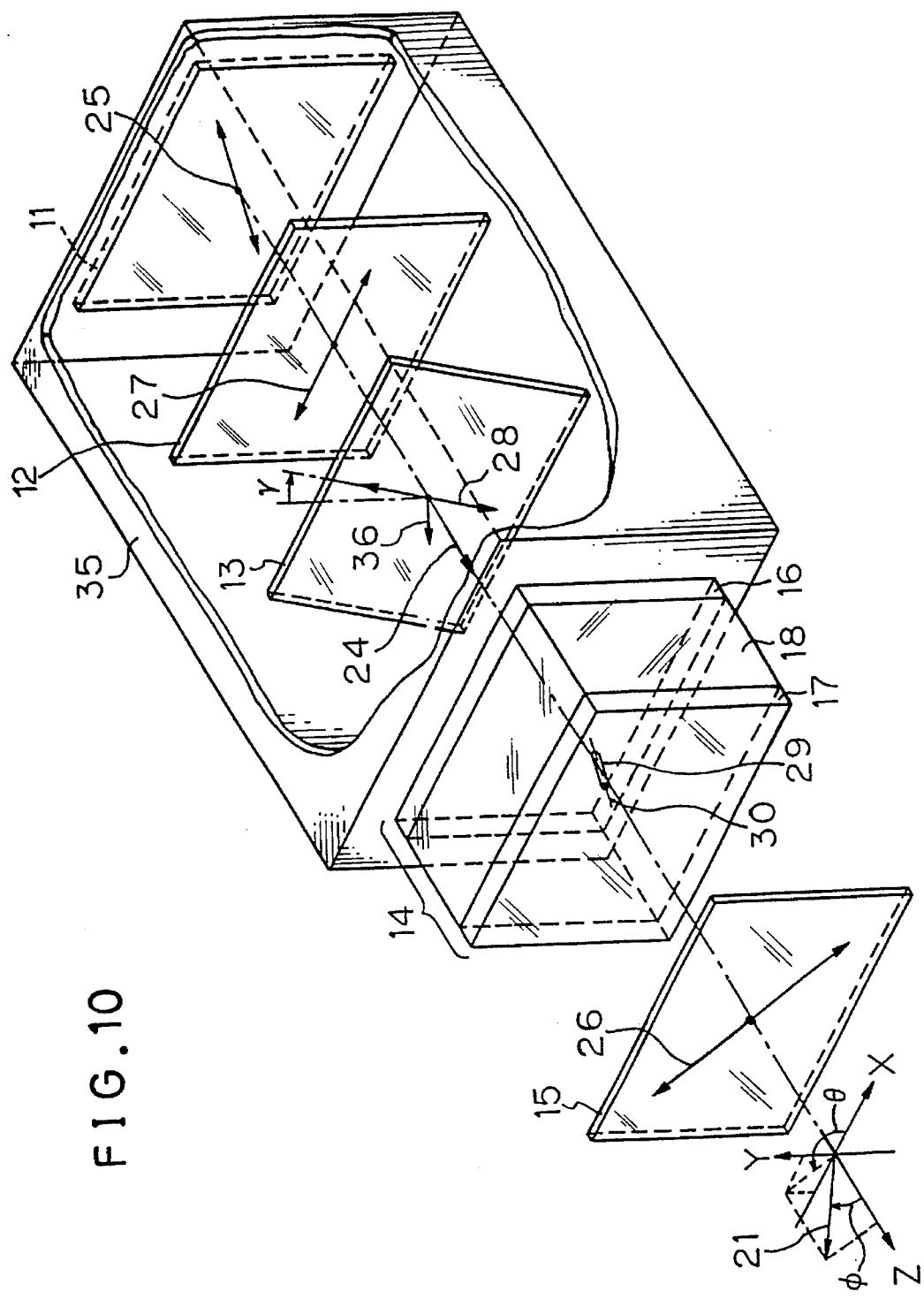

LIQUID CRYSTAL LIGHT VALVE APPARATUS WITH A PAIR OF NON-PARALLEL PHASE DIFFERENCE PLATES

FIELD OF THE INVENTION AND RELATED ART STATEMENT

1. Field of the Invention

The present invention relates to a liquid crystal light valve apparatus which produces an optical image by spatial modulation of light, and further to a projection display apparatus using the liquid crystal light valve apparatus.

2. Description of the Related Art

In a projection display apparatus for displaying an optical image obtained by a "light valve" (spatial modulation means of light) onto a screen through a projection lens, a liquid crystal panel (hereinafter is referred to as LC panel) is widely used for the light valve. Such a display apparatus is disclosed in the Japanese published unexamined patent applications Sho 63-73782 and Hei 3-71110, for example.

In general, an LC panel of twisted nematic type (hereinafter is referred to as TN type) is used for the display apparatus of projection type. An example of the display apparatus using the LC panel of the TN type in the prior art is shown in FIG. 1. Referring to FIG. 1, a light beam 301A emitted from a light source 301 is applied to the LC panel 312 of the TN type, and an optical image of the LC panel 312 is projected on a screen 304 through an optical lens 303.

The LC panel 312 comprises a liquid crystal cell 302 (hereinafter is referred to as LC cell), an incident side polarizing plate 305 and an outgoing side polarizing plate 306. The LC cell 302 comprises two transparent glass substrates 302A and liquid crystal 307 filled between both glass substrates 302A. Transparent electrodes for forming pixels and a plurality of thin film transistors (hereinafter referred to as TFT) for controlling the transparent electrodes are disposed on the inner surfaces of the glass substrates 302A. The TFTs are controlled by an image signal which is supplied from an external device. The above-mentioned LC cell 302 is called an active matrix type LC cell and the TFT serves as a switching element.

The liquid crystal 307 in the LC cell 302 turns the phase of an incident light in compliance with an electric field created between both the transparent electrodes, and accordingly, an optical image is generated in the LC cell 302. The LC panel 312 of the active matrix type is adequate to the LC apparatus of projection type in order to obtain a superior image quality. A color image is realizable by attaching color filters to the pixels of the LC cell 302.

The LC panel 312 of the TN type may be driven by two display modes. One of two the display modes is called a "normally black mode" (hereinafter is referred to as NB mode). In the NB mode, the polarization axis of the incident side polarizing plate 305 parallels the polarization axis of the outgoing side polarizing plate 306. When an electric field is not applied to the liquid crystal, a darkest optical image is displayed. The other display mode is called a "normally white mode" (hereinafter is referred to as NW mode). In the NW mode, the polarization axis of the incident side polarizing plate 305 is orthogonallzed to the polarization axis of the outgoing side polarizing plate 306. When the electric field is applied to the liquid crystal, a darkest optical image is displayed. In general, the LC panel 812 of the TN type is used on the NW mode. Since the NW mode is superior in the image quality of a black image in comparison with the NB mode, the LC panel of the NW mode is widely used for the display apparatus of projection type.

The direction of a normal line of the LC panel 312 is defined as a "reference direction", and an angle of an incident light measured from the reference direction is defined as a "viewing angle". In general, light modulation characteristics of the LC panel of TN type greatly varies dependent on the viewing angle. In the NW mode, a light transmittance in "black-display state" significantly varies dependent on the viewing angle. In the black-display state, the LC panel 312 is driven so that the light transmittance becomes a minimum. The viewing angle of the minimum light transmittance is not zero, but is some values of angle. In other words, the direction of the viewing angle in the minimum light transmittance is not coincident with the reference direction, and inclines toward a peculiar direction.

Though the light transmittance in "white-display state" also varies dependent on the viewing angle, a variation of intensity of light due to the variation of the light transmittance is far smaller than the intensity of the light transmitting the LC panel. Therefore, it very slightly affects the image quality of a projected image. In the white-display state, the LC panel 312 1s driven so that the light transmittance becomes a maximum. Consequently, in the LC panel 312 of the TN type, a contrast varies significantly dependent on the viewing angle.

The contrast is represented by a ratio of the light intensity of the transmission light in the white-display state to the light intensity of the transmission light in the black-display state. The higher the contrast becomes, the higher the image quality becomes. In order to realize a projection image having a high contrast, an incidence angle of the light irradiating the LC panel 312 must be in coincidence with the viewing angle of the minimum light transmittance. The variation of contrast due to the viewing angle is called "viewing angle dependence characteristic".

In FIG. 1, the light beam 301A from the light source 301 is transmitted along an optical axis 300 and is led to the LC panel 312. The light beam 301A passing the LC panel 312 is led to an en-trance pupil 310 of the projection lens 303. The optical axis 300 of the light beam 301A passes the center of gravity 309 of the LC cell 302 (the center of gravity is substantially equal to the center of the LC cell 302) and is directed to the center of gravity 311 of the entrance pupil 310. In order to realize the maximum contrast, the optical axis 309A of the LC panel 312 which is perpendicular to the LC cell 302 is to be displaced from the optical axis 308 of the projection lens 303 such that the optical axes 308 and 309A are in parallel. Namely, the light beam 301A is applied to the LC cell in the direction of a viewing angle so that a highest contrast is retained.

In order to realize a projection image of full color with high quality, a display apparatus of projection type using three LC panels of a prior art is disclosed in the Japanese published unexamined patent application Sho 62-133424, for example. In the prior art, light beams of the three primary colors (red, green, blue) are separated by means of dichroic mirrors. The light beams of the three primary colors are applied to respective LC panels for creating optical images corresponding to the light beams of the three primary colors. The light beams of the three primary colors outgoing from the three LC panels are combined by means of another dichroic mirror, and the projection image of full color is projected through a projection lens. In this case, the LC panel of TN type and NW mode is utilized in general, and the optical system of the apparatus is designed in view of the above-mentioned viewing angle dependence characteristic.

The LC panel described hereafter is of the active matrix TN type which is used in the NW mode. Since the LC panel in the prior art has the viewing angle dependence characteristic of contrast which cannot be disregarded, the direction of the viewing angle for achieving the maximum contrast is not coincident with the direction of the normal line of the LC panel. Therefore, a user must observe the LC panel in the direction of the viewing angle in order to directly observe the image having the maximum contrast. If the user observes the LC panel in the direction of the normal to, namely perpendicularly to the LC panel, he or she only see an image of a low contrast.

There is a problem which can not be disregarded in the case that a display apparatus of projection type is configured by using the LC panel. Namely, in case the center of gravity 309 of the display area of the LC cell 302 is displaced from the optical axis 308 of the projection lens 303 as shown in FIG. 1 In order to achieve a high contrast projection image, a field angle of the projection lens 303 must be increased than the case that the center of gravity 309 is coincident with the optical axis 308. In the projection lens of a large field angle, various aberrations are liable to appear. Moreover, since the diameter of the projection lens Increases, the size and weight of the projection lens increase. In general, brightness distribution of an image projected by a projection lens is rotation symmetric with respect to the optical axis. Therefore, if the center of gravity of the LC panel is dislocated with respect to the optical axis of the projection lens, the brightness on the screen is not uniform owing to inequality in the light distribution on the entrance pupil of the projection lens. In order to solve the above-mentioned disadvantages, the viewing angle dependence characteristics of contrast must be improved.

If an intensity of the electric field applied to the liquid crystal is increased, the viewing angle for achieving the maximum contrast decreases. In order to increase the intensity of the electric field, a power source voltage of driving circuits disposed on the peripheral portion of the LC panel must be increased. Consequently, heat generation increases. The heat is liable to give harmful influence to the liquid crystal of the LC cell.

In a projection display apparatus using the conventional LC panel, there is a disadvantage that positional relation between the projection display apparatus and the screen is restricted because of the viewing angle dependence characteristics. In the case that the incident angle of an illumination beam to the LC panel is coincident with the viewing angle of the maximum contrast, an image having the maximum contrast is projected on the screen. In this case, the image is projected to the screen in a direction inclined from the normal to the screen owing to a dislocation of the optical axis of the projection lens from the center of gravity of the LC panel. It is rather convenient that the projection display apparatus is displaced from the center of the screen because the projection display apparatus does not interfere with the field of vision of audience. However, since the viewing angle is predetermined, an installing position of the projection display apparatus is restricted by the condition to achieve the maximum contrast. Therefore, the projection display apparatus cannot be moved at an arbitrary position. If the projection display apparatus is moved at an arbitrary position, the contrast of the projected image is decreased.

On the other hand, it is familiar to one skilled in the art that light modulation characteristics including the viewing angle dependence characteristic of contrast of the LC panel may be improved by using a "retardation plate". For example, improvement of the viewing angle dependence characteristics of contrast by the retardation plate is disclosed in the Japanese patent number Hei 4-1888 (United States patent application No. 913618). According to this prior art, two linear retardation plates are disposed adjacent to the LC cell. However, leak of light from the LC panel in the black display state can not be effectively compensated. Therefore, this prior art is not feasible for improvement of the contrast in the LC apparatus of projection type, because the LC apparatus of projection type requires a high contrast.

For an LC panel using super twisted nematic liquid crystal, methods for improving the light modulation characteristics by use of the retardation plate are disclosed in the Japanese published unexamined patent applications Hei 3-257424 and Hei 5-210084, for example. These prior arts relate to improvement of the light modulation characteristic in a color LC panel which is directly observable by human eyes, and the improvement may be achieved in a wide range of the viewing angle. However, these prior arts are not feasible for application to the LC apparatus of projection type.

Analogously, Improvement of the viewing angle dependence characteristics of contrast in the LC panel of TN type is disclosed in the Japanese published unexamined patent application Hei 5-19249. The application field of the LC panel in the prior art of Hei 5-19249 is similar to the prior arts of Hei 3-257424 and Hei 5-210084, and is not feasible for the LC panel of projection type.

OBJECT AND SUMMARY OF THE INVENTION

An object of the present invention is to provide a liquid crystal light valve apparatus which is improved in viewing angle dependence characteristics of contrast. The liquid crystal light valve apparatus is capable of controlling viewing angle of maximum contrast in a liquid crystal panel of twist nematic type.

Another object of the present invention is to provide a liquid crystal light valve apparatus of projection type for projecting an image having a high contrast by using the above-mentioned liquid crystal panel.

In order to achieve the above-mentioned objects, the liquid crystal light valve apparatus of the present invention comprises an incident side polarizing means for passing linearly polarized light in a specified direction, a liquid crystal cell of which liquid crystal of twist nematic type of about 90 degree of twisted angle is enclosed between an incident side transparent substrate and an outgoing side transparent substrate, an outgoing side polarizing means for selectively passing linearly polarized light in a specified direction and a first phase difference means and a second phase difference means having functions which are similar to a uniaxial crystal of positive or negative.

The first phase difference means and the second phase difference means are disposed in a light path between the incident side polarizing means and the liquid crystal cell or in a light path between the liquid crystal cell and the outgoing side polarizing means. The direction of polarization of the incident side polarizing means is substantially coincident with the direction of a major axis of molecular of the liquid crystal contacting the incident side transparent substrate or is substantially perpendicular thereto. On a defined plane which is perpendicular to the optical axis of the incident light, a projection of the polarization axis of the incident side polarizing means on the plane is substantially perpendicular to a projection of the polarization axis of the outgoing side polarizing means, and the projection of the optical axis of the first phase difference means on the above-mentioned plane is substantially perpendicular to the projection of the optical axis of the second phase difference means. The projection of the polarization axis of the incident side polarizing means is about 45 degrees with respect to the projection of the optical axis of the first phase different means.

Provided that an angle between the optical axis of the first phase difference means and a plane which is perpendicular to a primary illumination ray passing the first phase difference means is represented by $\phi_1$, and an angle between the optical axis of the second phase difference means and a plane which is perpendicular to the primary illumination ray passing the second phase difference means is represented by $\phi_2$. The first phase difference means and the second phase difference means give phase differences which are equal in degree and are different in signs with each other to the primary illumination ray when the angles $\phi_1$ and $\phi_2$ are zero.

In case at least one of both angles $\phi_1$ and $\phi_2$ is not zero, the light intensity of the primary illumination ray after passing the liquid crystal cell and the outgoing side polarizing means becomes minimum in a black display state.

By the above-mentioned configuration, a small phase difference such that the liquid crystal cell in the black display state gives to the primary illumination ray is compensated by the first phase difference means and the second phase different means. Consequently, a light which is substantially linearly polarized in the perpendicular direction to the polarization direction of the outgoing side polarizing means is applied to the outgoing side polarizing means. Therefore, the most part of the light is absorbed and interrupted. Consequently, the intensity of the light in the black display state is reduced and the contrast is improved. A phase difference given by the first phase different means and the second phase different means is adjusted by changing the angles $\phi_1$ and $\phi_2$, and thus the viewing angle realizing the maximum contrast is controllable.

A display apparatus of projection type in accordance with the present Invention comprises a light source for emitting an illumination beam, a liquid crystal light valve apparatus having the first phase difference means and the second phase difference means and a projection lens for projecting an optical image on a screen.

Another display apparatus of projection type in accordance with the present invention comprises the light source for emitting the illumination beam including three primary color light components, a color separating means for separating the illumination beam into three light beams of three primary colors, and three liquid crystal light valve apparatus comprising the first phase difference means and the second phase difference means and forming three optical images corresponding to the respective three primary colors, a color combining means for combining three outgoing lights of the three liquid crystal light valve apparatus, and a projection lens for projecting three outgoing lights of the color combining means by superimposing on the screen.

Since the wavelength range of a visible light is divided into three wavelength ranges of the three primary colors, each wavelength range becomes one third of the wavelength range of the visible light. Therefore, the wavelength ranges which are applied to the respective first and second phase difference means are narrow. Consequently, an accuracy of compensation of the phase difference is improved and a compensation error is reduced.

Further liquid crystal light valve apparatus of projection type in accordance with the present invention comprises the light source for emitting the illumination beam, the liquid crystal light valve apparatus comprising the first phase difference means and the second phase difference means, the projection lens for projecting an optical image on the screen, and means for moving the projection lens in the perpendicular direction with respect to the optical axis of the projection lens. The arrangement of at least one of the first phase difference means and the second phase difference means are adjusted in accordance with the parallel moving with the principal face of the projection lens.

According to the above-mentioned configuration, the display apparatus of projection type is capable of projecting an image with a high contrast by suitably arranging the first phase difference means and the second phase difference means, even if the incident direction of the illumination beam with respect to the liquid crystal light valve apparatus is changed. Therefore, even if the image is projected in an oblique direction with respect to the screen, a projection image having a high contrast is always realizable.

Furthermore, in the liquid crystal light valve apparatus of projection type in accordance with the present invention a projection lens of a small field angle is usable, and the apparatus is capable of projecting an image which is uniform in brightness distribution.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 10 is a perspective view of a liquid crystal light valve apparatus of a second embodiment of the present invention;

It will be recognized that some or all of the Figures are schematic representations for purposes of illustration and do not necessarily depict the actual relative sizes or locations of the elements shown.

DESCRIPTION OF THE PREFERRED EMBODIMENTS

Basic structure and operation of a twisted nematic liquid crystal cell and a liquid crystal panel are described with reference to FIGS. 2, 3, 4, 5 and 6.

Figure 2:
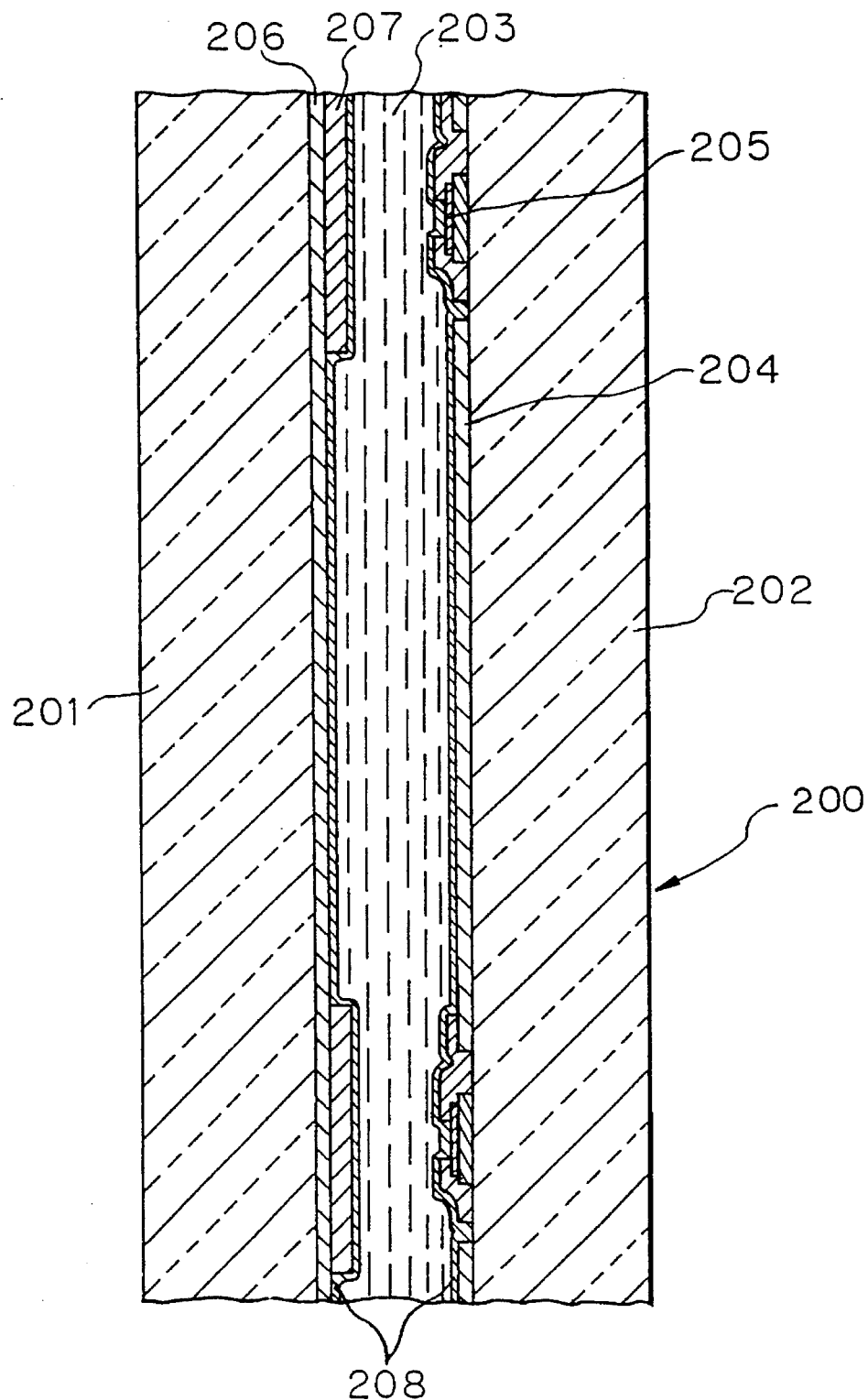
FIG. 2 is a cross-section of a twisted nematic liquid crystal cell of active matrix type.

FIG. 2 is a cross-section of a twisted nematic liquid crystal cell 200 (hereinafter referred to as TN-LC cell) which is used in the liquid crystal light valve apparatus of the present Invention. Referring to FIG. 2, liquid crystal 203 is enclosed between an incident side glass substrate 201 and an outgoing side glass substrate 202. The thickness of the liquid crystal 203 is several microns. Pixel electrodes 204, thin film transistors 205 (hereinafter is referred to as TFT) and gate and source signal lines (not shown) are formed on the outgoing side glass substrate 202. Opposite electrodes 206 are formed on the incident side glass substrate 201. Black matrix electrodes 207 are formed on the opposite electrodes 206 at the positions opposing to the TFTs 205 and the signal lines. Alignment films 208 are formed on the pixel electrodes 204 and the opposite electrodes 206.

A driving voltage is selectively supplied to the TFT 205 of each pixel in compliance with an image signal applied from an external device. An electric field corresponding to the driving voltage is applied to the liquid crystal 203, and a light passing the liquid crystal 203 is phase-shifted. This effect is called "light modulation effect".

Figure 3:
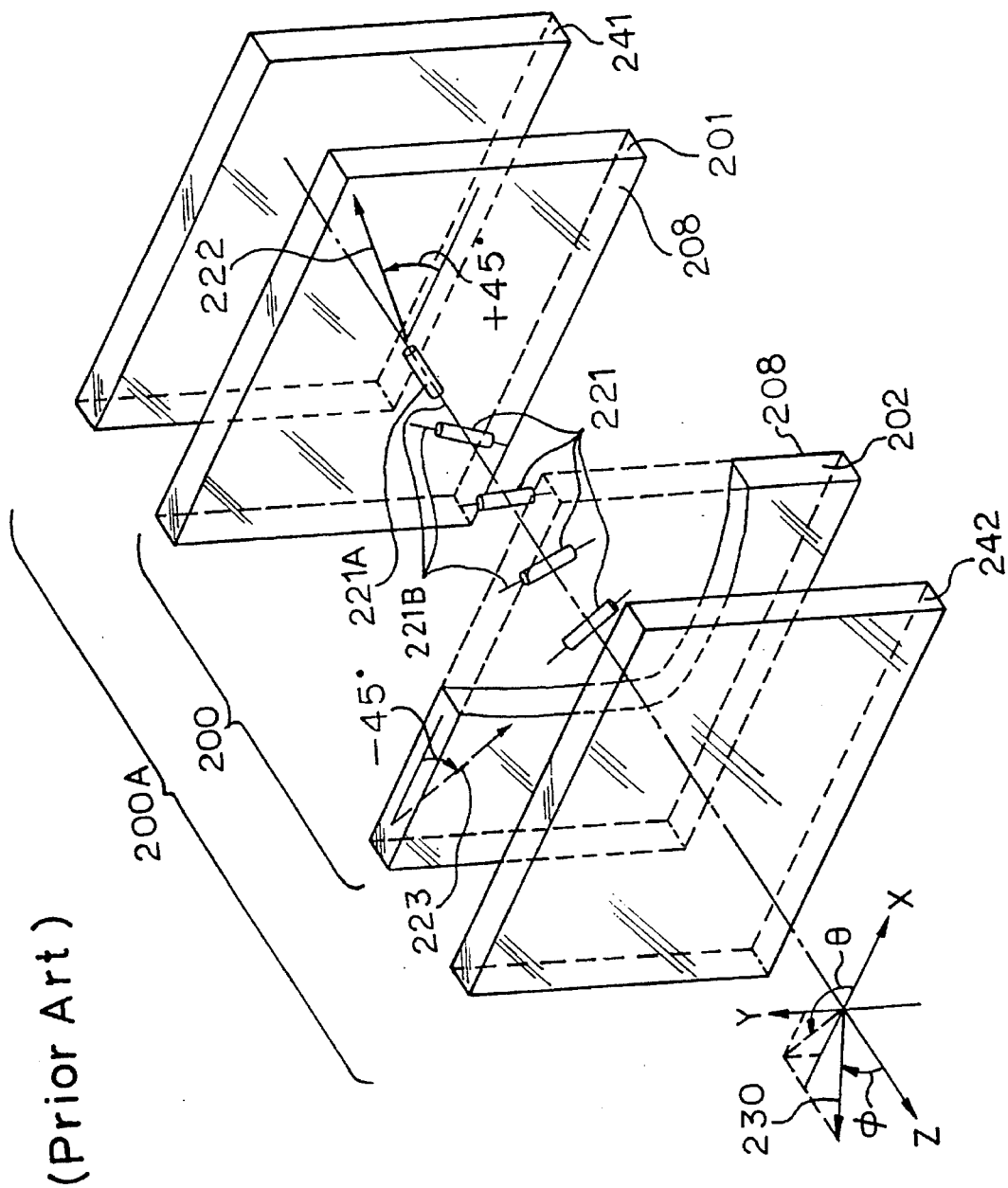
FIG. 3 is a perspective view of the twisted nematic liquid crystal cell in the state that an electric field is not applied thereto.

FIG. 3 is a perspective view of the LC cell 200 in a state that an electric field is not applied to the liquid crystal. Since known rubbing operation has been applied to the alignment film 208 of both the glass substrates in a predetermined direction in advance, moleculars of the liquid crystal contacting the alignment film 208 are aligned such that the major axis of the molecular is parallel to the rubbing direction. In FIG. 3, the alignment film 208 of the incident side glass substrate 201 has been rubbed in the direction shown by an arrow 222, and the alignment film 208 of the outgoing side glass substrate 202 has been rubbed in the direction shown by an arrow 223. The moleculars 221 of the liquid crystal are aligned between both the incident side glass substrate 201 and the outgoing side glass substrate 202 in a manner that the major axes of the moleculars 221 are gradually twisted between both the incident side glass substrate 201 and the outgoing side glass substrate 202. The major axes 221B of the moleculars 221 are parallel to the surface of both the glass substrates. The major axes 221A of the moleculars adjacent to the alignment film 208 are parallel to the rubbing direction of the alignment film 208. The twisted angle of the major axes of the moleculars of the liquid crystal 221 from the surface of the incident side glass substrate 201 to the surface of the outgoing side glass substrate 202 is equal to the difference of the angle between both the rubbing directions 222 and 223. In general, the twisted angle is 90 degrees.

In the case that a linearly polarized light of the same polarization direction as the major axis direction of a molecular 221A on the alignment film 208 of the incident side glass substrate 201 is applied to the above-mentioned LC cell 200, the polarization direction rotates in compliance with the variation of the major axis directions 221B of the moleculars 221 as the light passes through the liquid crystal. The light emitted from the LC cell 200 is a linearly polarized light, and the polarization direction of the light is perpendicular to the polarization direction of the incident light. In the case that the polarization direction of the incident light is perpendicular to the major axis direction of the molecular 221A, the light emitted from the LC cell 200 is also a linearly polarized light, and the polarization direction of the light is perpendicular to the polarization direction of the incident light.

Figure 4:
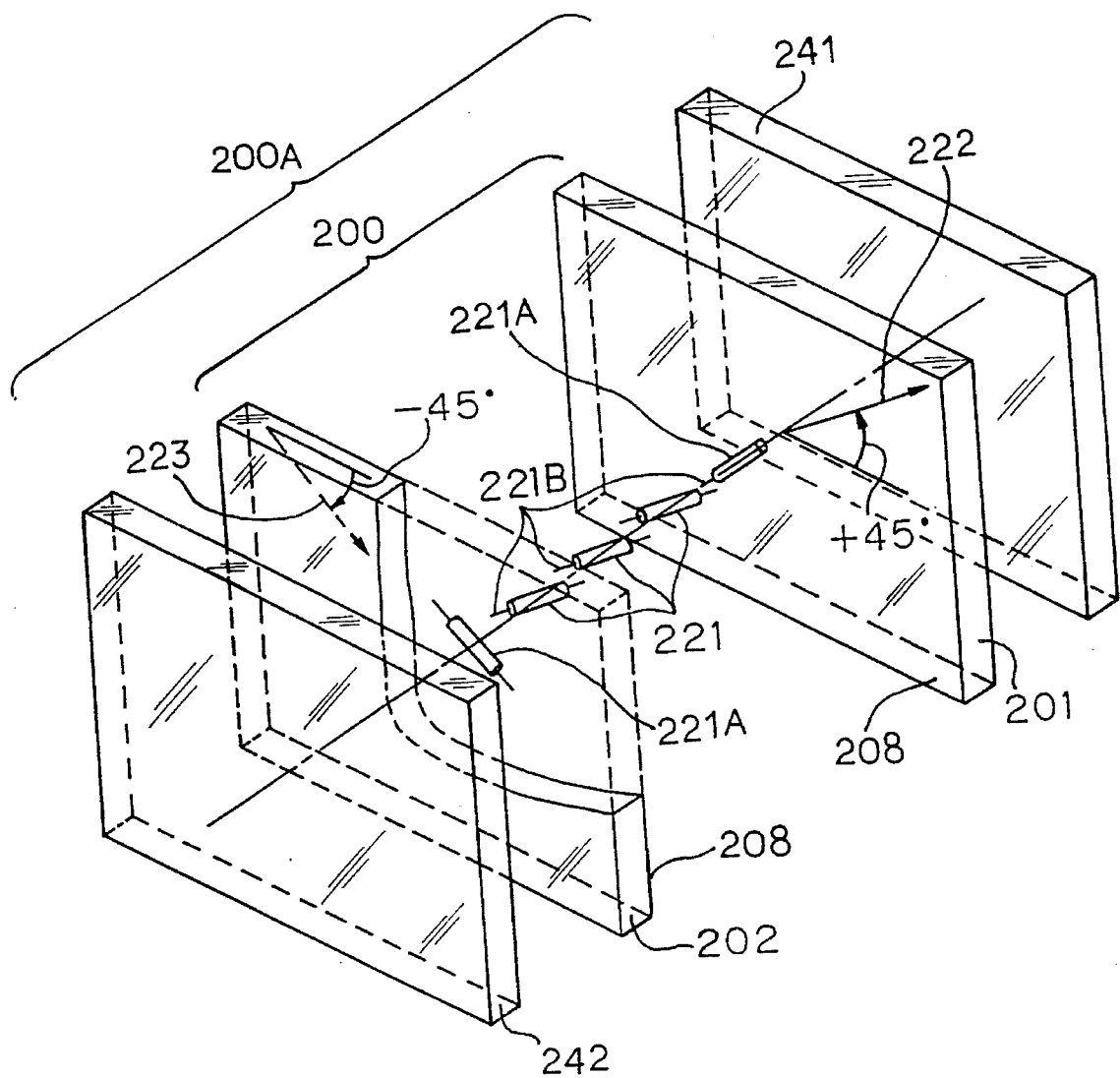
FIG. 4 is a perspective view of the twisted nematic liquid crystal cell in the state that the electric field corresponding to the maximum supply voltage is applied thereto.

FIG. 4 is a perspective view of the LC cell 200 in the state that a sufficient large electric field is applied to the liquid crystal. In this state, the major axes of the moleculars 221 of the liquid crystal are substantially aligned in the direction of the normal line of the LC cell 200 except for the molecular 221A adjacent to the alignment film 208.

In the case that the linearly polarized light of the same polarization direction as the major axis direction of the molecular 221A is applied to the LC cell 200, the light emitted from the LC cell 200 is a linearly polarized light, and the polarization direction of the light emitted from the LC cell 200 is substantially identical with that of the incident light. In the case that the polarization direction of the incident light is perpendicular to the major axis direction of the molecular 221A, the light emitted from the LC cell 200 is a linearly polarized light, and the polarization direction of the light is identical with that of the incident light. In strict consideration, since the LC cell 200 has a slight optical rotatory power and birefringence, the light emitted from the LC cell 200 becomes an elliptically polarized light of which the major axis is slightly deflected to the polarization direction of the incident light. However, a polarization component in a minor axis is far smaller than the polarization component in the major axis of the elliptically polarized light.

In FIG. 3, the LC cell 200 is sandwiched with an incident side polarizing plate 241 and an outgoing side polarizing plate 242, and a LC panel 200A is structured. The polarization direction of the incident side polarizing plate 241 (a polarization direction of the light passing through the polarizing plate 241) is arranged so as to coincide with the rubbing direction 222 of the incident side glass substrate 201, and the polarization direction of the outgoing side polarizing plate 242 is arranged so as to coincide with the rubbing direction 223 of the outgoing side glass substrate 202.

The LC panel 200A forms a lightest optical image in deenergized state of the LC cell 200 which is called the normal white mode (NW mode) as shown in FIG. 3. On the contrary, in the energizing state as shown in FIG. 4, since the polarization directions of both the polarizing plates 241 and 242 are perpendicular to each other, the LC panel 200A forms a darkest optical image. Even if the polarization directions of both the polarizing plates 241 and 242 are changed by 90 degrees, the same darkest optical image as the above-mentioned case is formed. In the embodiment of the LC panel 200A of the present invention, the LC panel 200A is structured to work in the NW mode.

Figure 5:
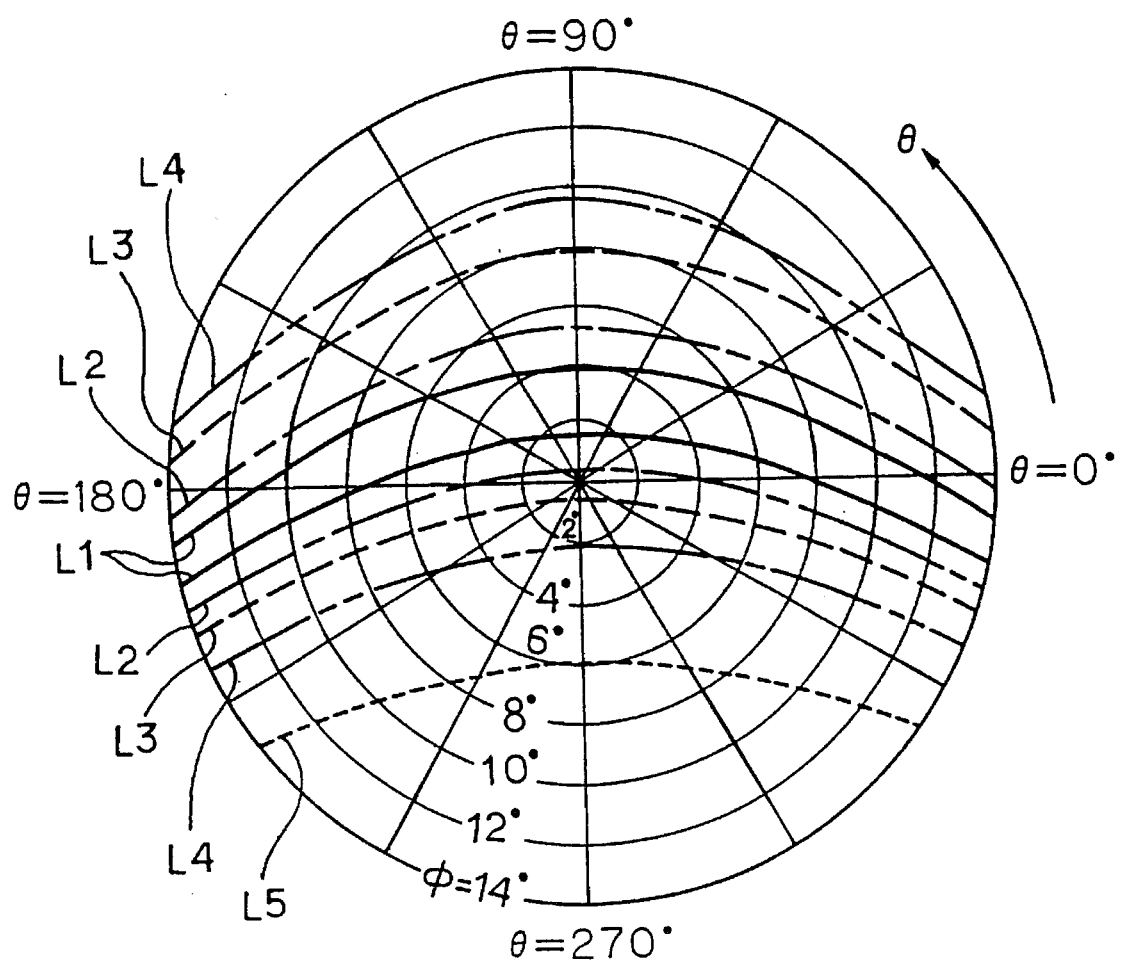
FIG. 5 is a characteristic diagram of a relation between a contrast and a viewing angle of the twisted nematic liquid crystal panel in a normally white mode.

In a TN-LC panel of the NW mode, an example of viewing angle dependence characteristics of contrast is represented by isocontrast lines as shown in FIG. 5. The thickness of the liquid crystal layer sandwiched with both the glass substrates 201 and 202 is about 5 μm. The contrast is defined by a value that an intensity of the outgoing light in deenergizing state is divided by an intensity of the outgoing light in energized state of about 6 volts of driving voltage. The definition of the viewing angle is described in detail with reference to FIG. 3.

In FIG. 3, provided that the normal line of the LC cell 200 is designated by Z coordinate axis, a horizontal direction of the LC cell 200 is designated by X coordinate axis and a perpendicular direction to the X coordinate axis on the LC cell 200 is designated by Y coordinate axis. The direction of a light beam 230 is represented by an elevation angle $\phi$ and an azimuth $\theta$. The elevation angle $\phi$ is the angle between the Z coordinate axis and the light beam 230. The azimuth $\theta$ is defined on the X–Y plane and is the angle between the X coordinate axis and the projection of the light beam 230 on the X–Y plane.

FIG. 5 is a characteristic diagram of relation between a contrast and a viewing angle of the LC panel 200A in the NW mode. Referring to FIG. 5, an azimuth 8 is graduated counterclockwise on periphery of the diagram, and an elevation angle $\phi$ is graduated in the radial direction. Concentric circles are illustrated every two degrees of the elevation angle $\phi$, and the outermost circle represents 14 degrees of elevation angle $\phi$. In the characteristic diagram of FIG. 5, solid lines L1 are isocontrast lines of 900, chain lines L2 are isocontrast lines of 700, broken lines L8 are isocontrast lines of 500, chain double-dashed lines L4 are isocontrast linesa of 300 and dotted line L5 is isocontrast line of 100. Therefore, the contrast is 900 or more in the area between both solid lines L1, and the contrast is larger than 700 and is smaller than 900 in both the areas between the solid line L1 and a neighboring chain line L2. In a similar manner, the contrast is 500–700 in both the areas between the chain line L2 and a neighboring broken line L3, and the contrast is 300–500 in both the areas between the broken lines L3 and a neighboring chain line L4. The contrast is 100–300 in the area between the chain line L4 and a dotted line L5. As shown in FIG. 5, the highest contrast is realized at 90 degrees of azimuth $\theta$ and about 3 degrees of elevation angle $\phi$. In general, a range of angle realizing a higher contrast is wider in the horizontal direction than the vertical direction. A lowest contrast is at the direction of 270 degrees of azimuth $\phi$.

Decrease of the contrast is mainly caused by increase of light intensity in the black display state. In the energizing state shown in FIG. 4, the light passing through the LC cell 200 is slightly changed in the phase and becomes an elliptically polarized light. A phase difference given by the liquid crystal cell 200 is varied dependent on the direction of the incident light, and the state of the elliptically polarized light is changed. Consequently, the amount of light passing through the outgoing side polarizing plate changes.

The elliptically polarized light may be converted to a linearly polarized light by means of a suitable linear retardation plate (hereinafter is referred to as retardation plate). Prior to description of embodiments of the present invention, the effect of the retardation plate is described in detail.

Figure 6:
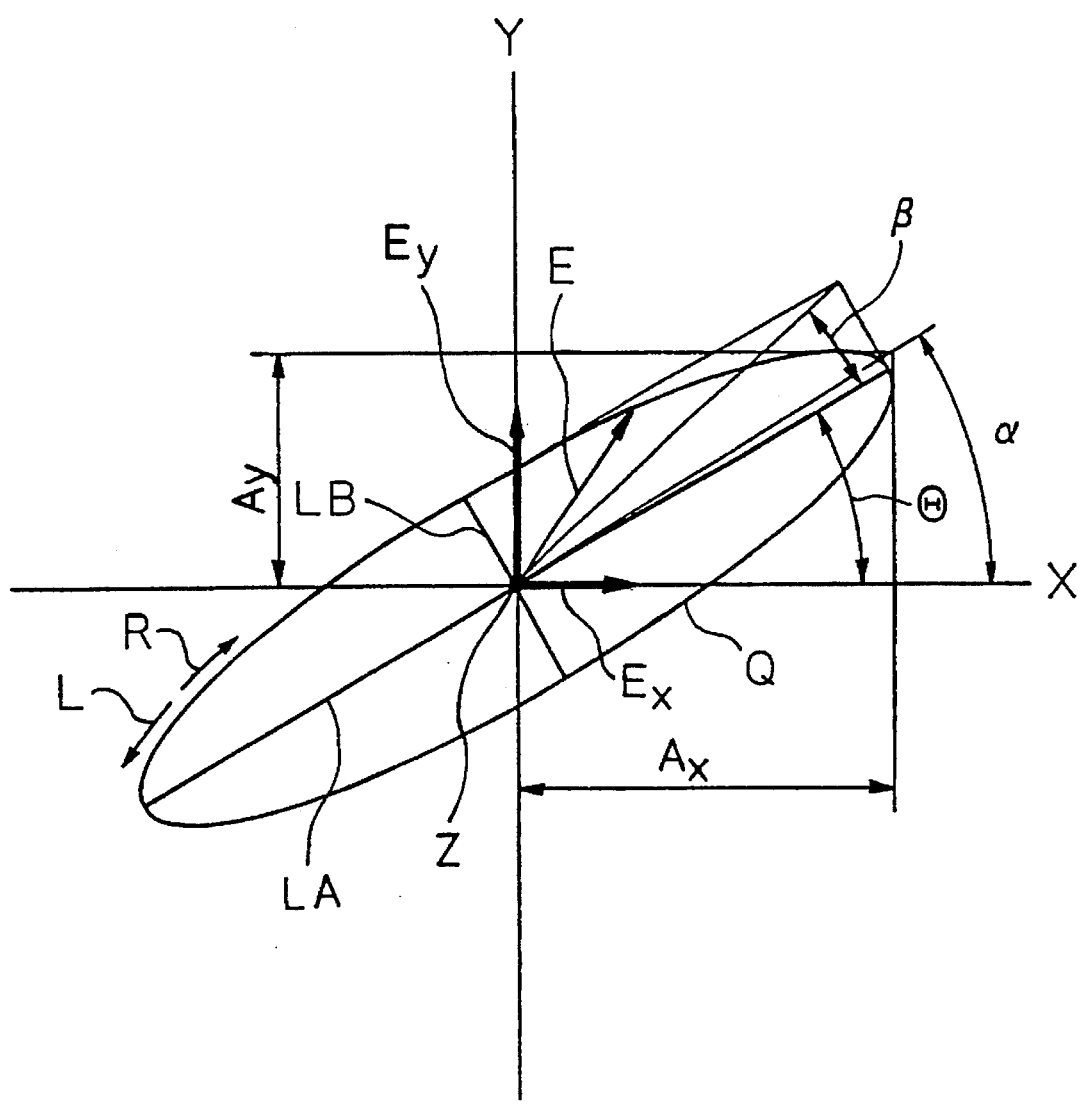
FIG. 6 is a diagram representing an elliptically polarized light.

FIG. 6 is a diagram representing an elliptically polarized light. Referring to FIG. 6, the light is directed from the back to the front of the paper surface, and a perpendicular axis with respect to the paper surface is defined as Z coordinate axis. On the paper surface, X coordinate axis and Y coordinate axis are defined in the horizontal direction and vertical direction, respectively. An electric field vector E is defined on the X–Y plane on the condition of a constant of Z coordinate. An oscillation component $E_x$ in the X coordinate axis and an oscillation component $E_Y$ in the Y coordinate axis of the electric field vector E are expressed by equations (1) and (2).

$$E_X = A_X \cdot \cos(\tau) \quad (1),$$

$$E_y = A_y \cdot \cos(\tau + \delta) \quad (2).$$

Coefficients $A_x$ and $A_y$ are maximum amplitudes of the respective oscillation components, "$\tau$" represents a function of a time and a position Z, and "$\delta$" represents a phase difference. If the phase difference $\delta$ is a positive value, the oscillation component $E_y$ in the Y coordinate axis leads the oscillation component $E_x$ in the X coordinate axis by a phase angle.

in FIG. 6, a path Q of the tip of the electric field vector E generally becomes an ellipse. The elliptically polarized light is represented by an "amplitude ratio angle" $\alpha$, an angle $\Theta$ of a direction of elliptical major axis (hereinafter is referred to as elliptical major axis angle $\Theta$) and an "angle $\beta$ of ellipticity" (hereinafter is referred to as ellipticity angle $\beta$). For example, when a "reference direction" is defined as the X coordinate axis, the amplitude ratio angle $\alpha$ and the ellipticity angle $\beta$ are represented by the following equations (3) and (4), respectively, $$\alpha = \tan^{-1}(A_y/A_x) \quad (3),$$

$$\beta = \tan^{-1}(C_b/C_a) \quad (4).$$

The amplitude ratio angle $\alpha$ depends on a ratio of the maximum amplitude $A_x$ in the X coordinate axis to the maximum amplitude $A_y$ in the Y coordinate axis of FIG. 6. The range of the amplitude ratio angle $\alpha$ is 0–90 degrees. The ellipticity angle $\beta$ depends on the ratio of a length $C_a$ of the major axis LA to a length $C_b$ of the minor axis LB of the ellipsis. The ellipticity angle β is attached with positive or negative sign, and the positive sign is given to a clockwise elliptically polarized light R and the negative sign is given to a counterclockwise elliptically polarized light L. The elliptical major axis angle Θ is defined by an angle between the elliptical long axis LA and the X coordinate axis.

Relations of the amplitude ratio angle α, the elliptical major axis angle Θ, the ellipticity angle β and the phase difference δ are represented by the below-mentioned equations (5) and (6) (see "Crystal Optics" compiled by "Applied Physical Society Optical Conversation" and published by Morikita Co., Ltd., 1975, page 121,).

$$\tan 2\Theta = \tan 2\alpha \cdot \cos \delta \quad (5),$$

$$\sin 2\beta = \sin 2\alpha \cdot \sin \delta \quad (6).$$

The equation (5) is indefinite in the case of $A_x = A_y$. In this case, the light becomes an elliptically polarized light of which the elliptical major axis angle Θ is 45 degrees and the ellipticity angle β is δ/2. In the case that the phase difference δ is $\pm(n-1)\pi$ (n: natural number), the light becomes a linearly polarized light of the direction of an amplitude ratio angle α. In the case that the phase difference δ is $\pm(n-1/2)\pi$, the light becomes a circularly polarized light.

Subsequently, in a retardation plate of a thickness D, a refractive index $N_f$ in the direction of X coordinate axis and a refractive index $N_s$ in the direction of Y coordinate axis, provided that $N_s > N_f$, the Y coordinate axis is called a "slow axis" because the phase relatively lags in the direction of the refractive index $N_s$, and the X coordinate axis is called a "fast axis" because the phase relatively leads in the direction of the refractive index $N_f$. A difference of a light path length of an oscillation component in the direction of the slow axis and a light path length of an oscillation component in the direction of the fast axis is called a "retardation Γ", and is defined by equation (7). The thickness D is measured along the passing direction of the light.

$$\Gamma = (N_s - N_f) \times D \quad (7).$$

A phase difference δ' (δ'>0) which is given to a light of a wavelength λ passing through the retardation plate is expressed by equation (8) including the retardation Γ.

$$\delta' = \frac{2\pi \Gamma}{\lambda} \quad (8)$$

In the case that the phase of the oscillation component $E_y$ in the direction of Y coordinate axis of the elliptically polarized light shown in FIG. 6 lags the phase of the oscillation component $E_x$ in the direction of X coordinate axis, the direction of the fast axis of the retardation plate is set to the X coordinate axis, and the direction of the slow axis is set to the Y coordinate axis. On the contrary, in the case that the phase of the oscillation component $E_y$ in the direction of Y coordinate axis lags the phase of the oscillation component $E_x$ in the direction of X coordinate axis, the direction of the fast axis of the retardation plate is set to the Y coordinate axis and the direction of the slow axis is set to the X coordinate axis. By the above-mentioned operation, if the relation between the phase difference δ of the elliptically polarized light and the phase difference δ' which is given by the retardation plate meets equation (9), the light passed through the retardation plate becomes a linearly polarized light.

$$\delta' = |\delta| + 2n\pi \; (n=0,1,2,3,\dots) \quad (9).$$

In general, conversion from the elliptically polarized light to the linearly polarized light by means of a suitable retardation plate is called "phase compensation." The polarized direction of the phase-compensated linearly polarized light is identical with the direction of the amplitude ratio angle α. In the case that the ellipticity angle β is small, the direction of the linearly polarized light is approximately coincident with the elliptical major axis angle Θ in the elliptically polarized light before the phase compensation.

In FIG. 6, though the X coordinate axis is set to the reference direction, an arbitrary direction may be set to the reference direction. The amplitude ratio angle a is varied by setting of the reference direction. Therefore, in an elliptically polarized light having the same ellipticity angle β, if the reference direction is changed, a phase difference δ to be compensated is also changed as shown in equation (6). Consequently, the phase of an elliptically polarized light may be compensated and converted to a linearly polarized light by selecting the direction of arrangement of the retardation plate having an arbitrary retardation Γ. In the arrangement of the retardation plate, the slow axis and the fast axis of the retardation plate are set to the directions which satisfy equation (9).

Action in embodiments of the present invention is based on the principle compensating the phase difference of the elliptically polarized light. In general, when a linearly polarized light is applied to the TN-LC cell in the state of black display state, an outgoing light becomes an elliptically polarized light. The ellipticity angle β of the elliptically polarized light is relatively small, and the direction of the elliptical major axis is approximately identical with the direction of a polarization axis of the incident side polarizing plate. Since the phase is compensated by applying a suitable retardation plate, a polarized component passing the outgoing side polarizing plate is reduced, and a light intensity in the black display state is decreased. Consequently, the contrast of an image is improved. The action of the retardation plate is attainable by arranging the retardation plate in the incident light path to the LC cell or in the outgoing light path from the LC cell.

On the other hand, the phase difference caused by the LC cell and the retardation plate depends on a wavelength and a passing direction. Therefore, in precise consideration, the condition by which the phase difference is compensated is effective with respect to only the light having a particular wavelength and a particular light path. Under the same condition, in order not to increase compensation error with respect to the light of different wavelength and the light of different passing direction, use of a retardation plate having a small retardation Γ is preferable.

Moreover, in the embodiments, the reference direction with respect to the elliptically polarized light to be compensated is set to 45 degrees with respect to the major axis of an elliptically polarized light. In case the ellipticity angle β is very small, the amplitude ratio angle α becomes about 45 degrees by the above-mentioned setting. So a phase difference δ of two oscillation components divided into the reference direction and the direction perpendicular to the reference direction becomes a minimum value as shown by equation (6). Therefore, the phase difference may be compensated by using the retardation plate having a minimum retardation F. In actual operation, the direction of 45 degrees with respect to the polarization axis of the incident side polarizing plate is set to the reference direction, and the direction of the optical axis of the retardation plate is made to coincide with the reference direction. The retardation Γ may be decided so that the phase difference δ' is twice of the ellipticity angle β of an elliptically polarized light. Consequently, compensation errors with respect to the light having the different wavelength and the path in the different direction do not increase and may be improved in the contrast.

In general, in the case that a linearly polarized light is applied to the TN-LC cell of black display state in the direction of the normal line of the LC cell, an ellipticity angle β of an outgoing light is 1–2 degrees. In the case of 45 degrees of the amplitude ratio angle α, the retardation Γ of the retardation plate for compensating the phase difference must be 1.5–3 nm with respect to the light of 540 nm of wavelength, for example.

The retardation plate is made of transparent plastics by spreading to a thin film. Such a retardation plate may be mass-produced and is inexpensive. The retardation Γ of the retardation plate of the conventional film type is at least several ten nm. In order to compensate a small phase difference, a retardation plate having a further small retardation Γ is preferable. However, such a thin retardation plate is difficult to produce and maintain an accurate retardation value, and it is particularly difficult to maintain a uniform characteristic on a desired areas of the retardation plate. Therefore, such a retardation plate is not practical.

In the LC display apparatus in the embodiments, the effect of the retardation plate of a small retardation Γ, such as several nm, may be equivalently achieved by interdependent effect of two retardation plates having relatively large retardation Γ such as several ten nm. Consequently, a small phase difference generated in the TN-LC cell in the black display state is effectively compensated.

[FIRST EMBODIMENT OF LIQUID CRYSTAL LIGHT VALVE APPARATUS]

Figure 7:
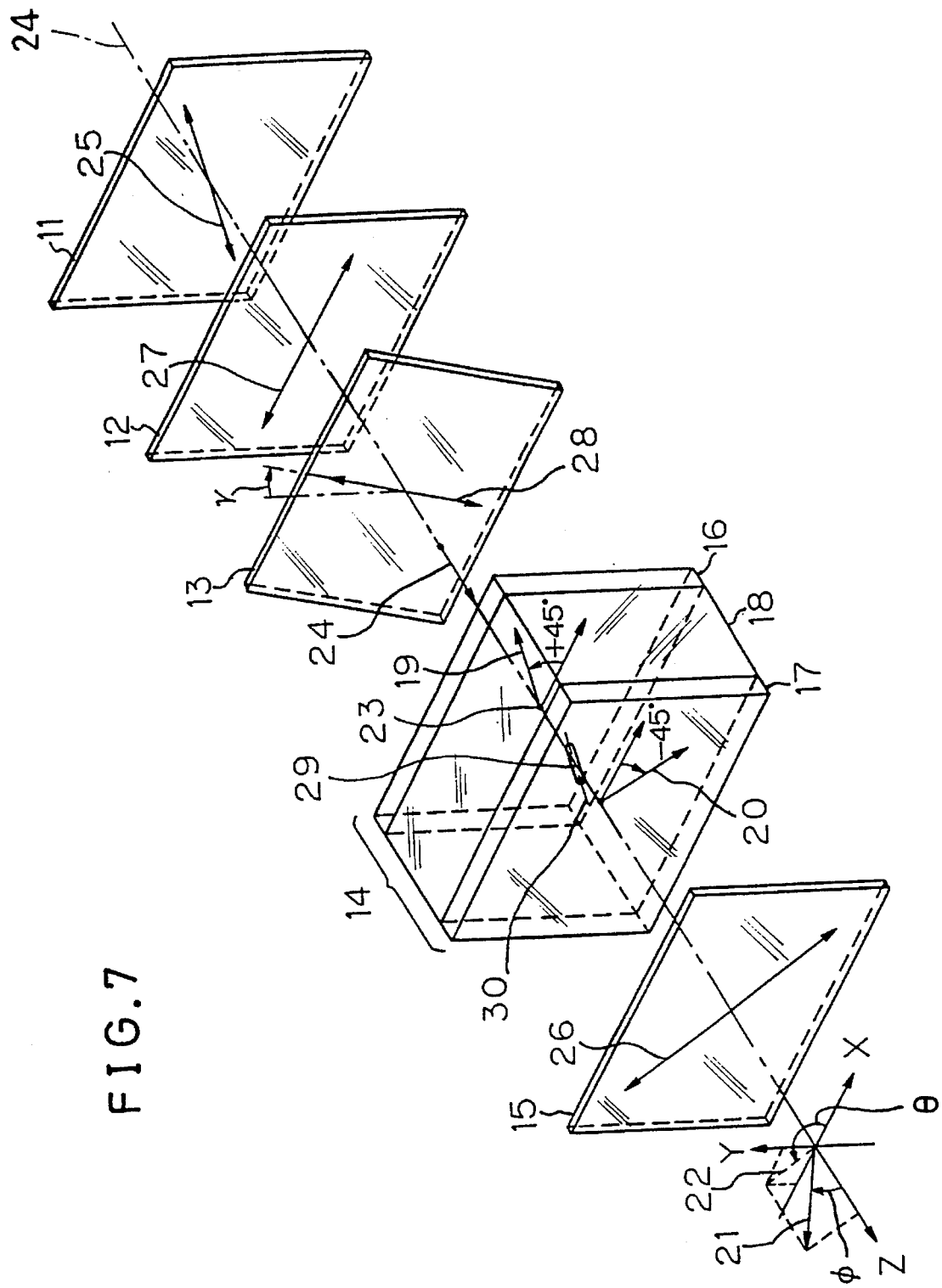
FIG. 7 is a perspective view of a liquid crystal panel of a first embodiment of the present invention.

FIG. 7 is a perspective view of the liquid crystal light valve apparatus of the first embodiment of the present invention. The liquid crystal light valve apparatus comprises an incident side polarizing plate 11, a first phase difference plate 12, a second phase difference plate 13, a LC cell 14 and an outgoing side polarizing plate 15 which are arranged in the named order along an optical axis 24 of a primary illumination ray. The primary illumination ray is representative of a plurality of light beams which are different in wavelength and pass the LC cell 14 in various directions. The LC cell 14 comprises an incident side glass substrate 16, an outgoing side glass substrate 17 and liquid crystal 18 of TN type enclosed between both the glass substrates 16 and 17.

In FIG. 7, an orthogonal coordinate system of X, Y and Z are set. The X coordinate axis is set in the horizontal direction of the LC cell 14, the Y coordinate axis is set in the vertical direction and the Z coordinate axis is set in the normal line direction of the LC cell 14. The direction of a light 21 is represented by an elevation angle φ and an azimuth θ. The elevation angle φ is an angle between the direction of the light 21 and the Z coordinate axis. The azimuth θ is an angle between the X coordinate axis and the projection 22 of the light 21 on the X–Y plane. The above-mentioned primary illumination ray is a light along the optical axis 24 passing through the center of gravity of the LC cell 14, and the optical axis 24 is coincident with the Z coordinate axis. The primary illumination ray is a single frequency light of a wavelength λ, for example.

In general, in the LC cell 14, the rubbing direction of the incident side glass substrate 19 is +45 degrees with respect to the X coordinate axis as shown by an arrow 19, and the rubbing direction of the outgoing side glass substrate 17 is −45 degrees with respect to the X coordinate axis as shown by an arrow 20. A polarization axis 25 of the incident side polarizing plate 11 and a polarization axis 26 of the outgoing side polarizing plate 15 are perpendicular to the optical axis 24 of the primary illumination ray (hereinafter is referred to as primary illumination ray 24), and are on the X–Y plane. The input side polarizing plate 11 and the outgoing side polarizing plate 15 are arranged such that the direction of the polarization axis 25 of the incident side polarizing plate 11 is coincident with the rubbing direction 19 of the alignment film of the incident side glass substrate 16. In a similar manner, the direction of the polarization axis 26 of the outgoing side polarizing plate 15 is coincident with the rubbing direction 20 of the alignment film of the outgoing side glass substrate 17. The polarization axis 25 of the incident side polarizing plate 11 is perpendicular to the polarization axis 26 of the outgoing side polarizing plate 15. The LC cell 14 is operated by the NW mode.

The first phase difference plate 12 and the second phase difference plate 13 are film-like retardation plates which are made by spreading transparent plastics such as polycarbonate, and both the first phase difference plate 12 and the second phase difference plate 13 have the same retardation Γ. The film-like retardation plate is adhered on a glass substrate for forming the phase difference plate.

Function of the phase difference plate is described with reference to an index ellipsoid 50 in FIG. 8. An orthogonal coordinate system of X', Y', Z' are introduced in FIG. 8. Refractive indexes in the directions of the X' coordinate axis, the Y' coordinate axis and the Z' coordinate axis are represented by $N_x$, $N_y$ and $N_z$, respectively. In general, an ellipsoid having three axes of respective lengths corresponding to the refractive which is used to represent anisotropy of refractive index of material. For example, in the case that the refractive indexes of a material in two directions are equal and the refractive index in only one direction is different from others, as expressed by $N_x=N_y\neq N_z$, for example, the material is an uniaxial crystal. In the uniaxial crystal expressed by $N_x=N_y\neq N_z$, in the case of $N_x=N_y<N_z$, it is called a positive uniaxial crystal, and in the case of $N_x=N_y>N_z$, it is called a negative uniaxial crystal. In both cases, the Z' coordinate axis which is different from others in refractive index is called an "optical axis".

In the retardation plates which are used for the first phase difference plate 12 and the second phase difference plate 13, provided that the direction along the surface is designated by Z' coordinate axis and the direction of thickness is designated by a Y' coordinate axis, anisotropy of the refractive index is approximately expressed by $N_x=N_y<N_z$. Namely, the retardation plate is similar to a positive uniaxial crystal of which the optical axis is along the surface direction thereof. In FIG. 8, the Z' coordinate axis is the optical axis 51. The refractive index is maximum in the direction of the optical axis 51, and the refractive index in the direction of the optical axis 51 is called a "refractive index $N_s$ in a slow axis direction". The refractive index is minimum in the perpendicular direction to the optical axis 51, and it is called a "refractive index $N_f$ in a fast axis direction". The refractive index $N_s$ in the slow axis direction is equal to the refractive index $N_z$ ($N_s=N_z$) and the refractive index $N_f$ in the first axis direction is equal to the refractive indexes $N_x$ and $N_y$ ($N_f=N_x=N_y$).

Figure 8:
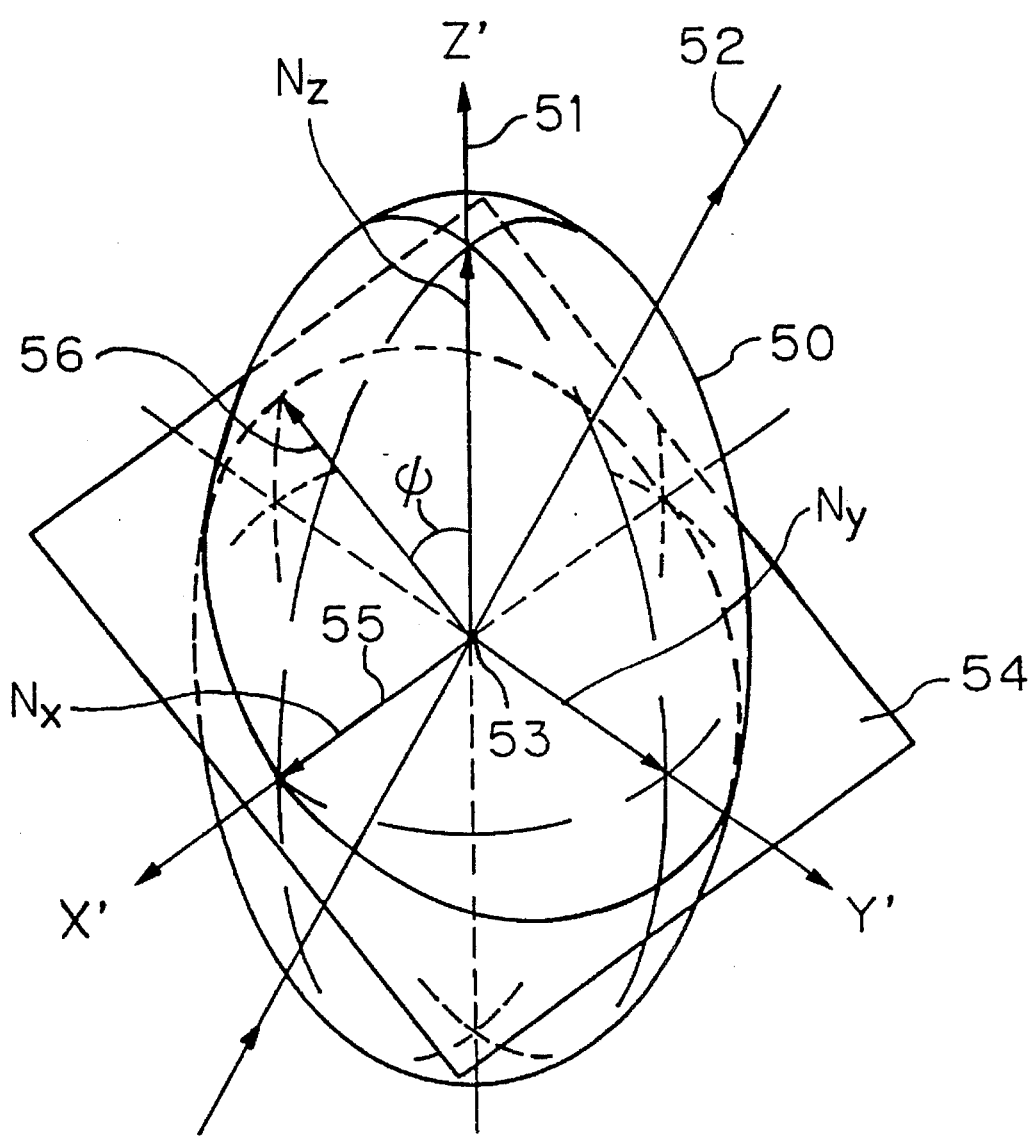
FIG. 8 is a diagram representing an "index ellipsoid" expressing a function of a phase difference plate.

When a light 52 passes the origin 53 in a crystal shown in FIG. 8, the light 52 is subjected to phase difference by the crystal. The phase difference is depends on the anisotropy of refractive index on a plane 54 which is perpendicular to the light 52. An angle between the plane 54 and the optical axis 51 is designated by φ. As to the light 52, a fast axis which is smallest in the refractive index is perpendicular to both the optical axis 51 and the light 52. A slow axis is perpendicular to the fast axis on the plane 54. For example, if the light 52 passes on the Y'–Z' plane, the fast axis 55 is coincident with the X' coordinate axis. The slow axis 56 is coincident with the direction of the projection of the optical axis 51 on the plane 54. The refractive index in the fast axis direction 55 is equal to the refractive index $N_f$. The refractive index $N_s'$ in the slow axis direction 56 is represented by equation (10).

$$N_s' = \frac{N_s \cdot N_f}{\sqrt{N_s^2 \sin^2\phi + N_f^2 \cos^2\phi}} . \qquad (10)$$

Referring to FIG. 7, operation of the phase difference plates 12 and 13 are described hereafter. A predetermined electric field is applied to the liquid crystal 18, and a most dark optical image is formed in the LC apparatus. In the first phase difference plate 12 and the second phase difference plate 13, the refractive index in the direction of the optical axis (slow axis) is designated by $N_s$, the refractive index in the direction (fast axis) perpendicular to the optical axis is designated by $N_f$ and the thickness is designated by D.

The first phase difference plate 12 is disposed perpendicular to the primary illumination ray 24, and the direction of an optical axis 27 of the first phase difference plate 12 is coincident with the X coordinate axis. The second phase difference plate 13 is disposed perpendicular to the primary illumination ray 24, and the direction of the optical axis 28 of the second phase difference plate 13 is slanted by an angle γ with respect to the Y coordinate axis in the Y–Z plane.

Hereafter, relation between the primary illumination ray 24 and the first and second phase difference plates 12 and 13 is elucidated in detail.

Figure 9A:
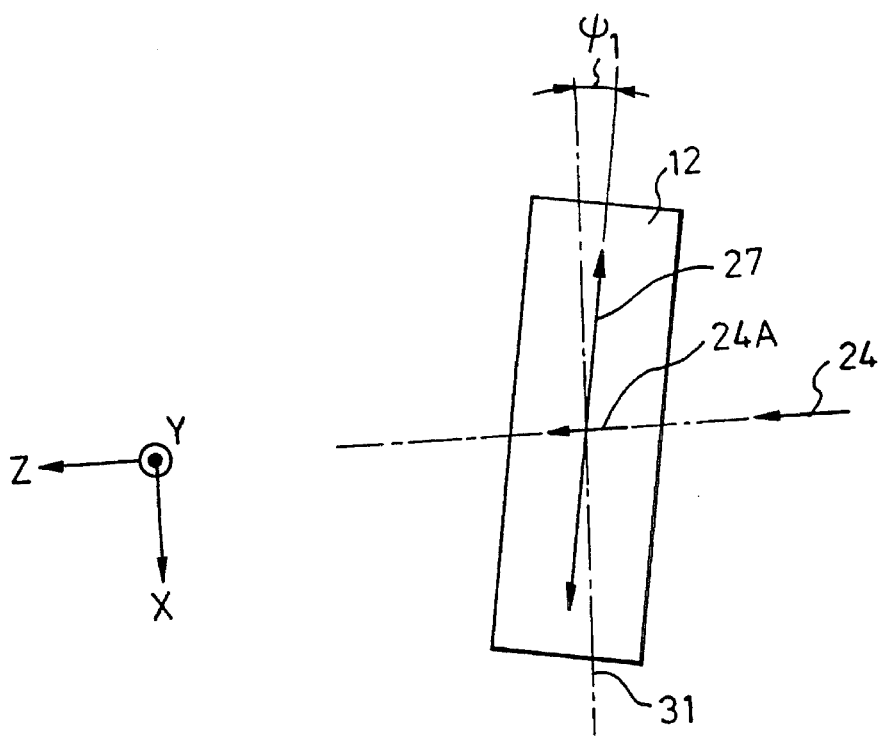
FIG. 9A is a side view of a first phase difference plate illustrating an incident angle of an incident light.

FIG. 9A is a plan view of the first phase difference plate 12 observed in the direction of Y coordinate axis in FIG. 7. The optical axis 27 of the first phase difference plate 12 and the primary illumination ray 24 are parallel to the X–Z plane. The primary illumination ray 24 entered in the first phase difference plate 12 is refracted on a boundary phase of the first phase difference plate 12 and the passing direction is changed as shown by an arrow 24A. The primary illumination ray shown by the arrow 24A (hereinafter is referred as primary illumination ray 24A) is also parallel to the X–Z plane in the first phase difference plate 12. In the first phase difference plate 12, a plane 31 which is perpendicular to the primary illumination ray 24A is defined, and an angle between the plane 31 and the optical axis 27 is designated by $\phi_1$. In FIG. 7, the angle $\phi_1$ is zero degrees. In this case, the first phase difference plate 12 is disposed perpendicular to the primary illumination ray 24, and the primary illumination ray 24 is not refracted on the boundary face. Therefore, the direction of the primary illumination ray 24 is not changed in the first phase difference plate 12, and the optical axis 27 is coincident with the X coordinate axis.

Figure 9B:
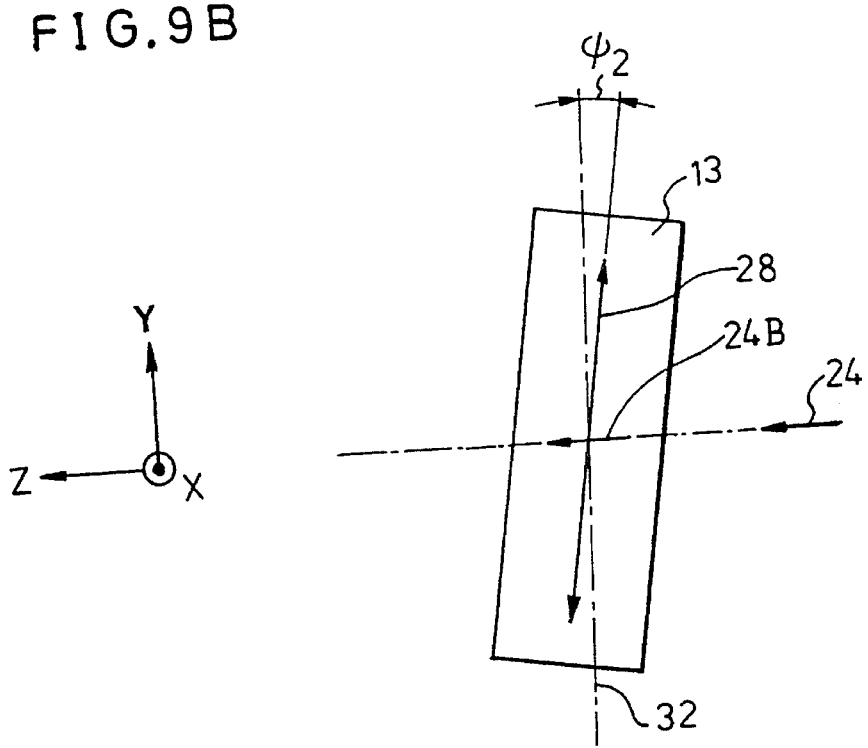
FIG. 9B is a side view of a second phase difference plate illustrating an incident angle of an incident light.

FIG. 9B is a side view of the second phase difference plate 13 observed in the direction of X coordinate axis which is perpendicular to the paper surface. The optical axis 28 of the second phase difference plate 13 and the primary illumination ray 24 are parallel to the Y–Z plane. The primary illumination ray 24 entered in the second phase difference plate 13 is refracted on the boundary face of the second phase difference plate 13 and the passing direction is changed as shown by an allow 24B. The primary illumination ray shown by the allow 24B in the second phase difference plate 13 is also parallel to the Y–Z plane. In the second phase difference plate 13, a plane 32 which is perpendicular to the primary illumination ray 24B is defined, and an angle between the plane 32 and the optical axis 28 is designated by $\phi_2$. In FIG. 7, the angle $\phi_2$ is decided by a slant angle γ of the second phase difference plate 13, and the angle γ is substantially equal to the angle $\phi_2$ without consideration of refraction on the boundary face. If the passing direction of the primary illumination ray 24B in the second phase difference plate 13 is derived by the refractive index of the second phase difference plate 13 and the refractive index of the medium, the angle $\phi_2$ is accurately derived.

Figure 9C:
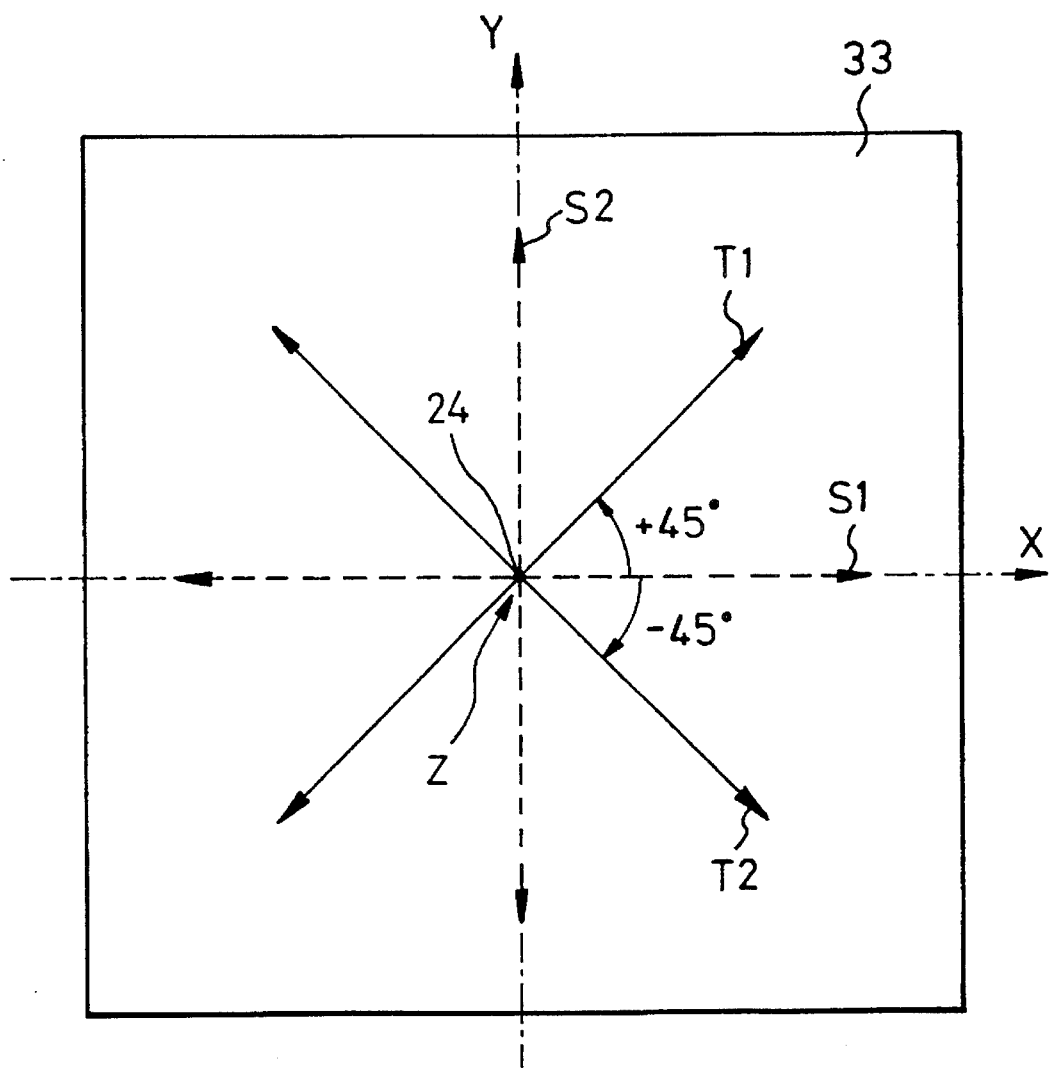
FIG. 9C is a diagram illustrating relation of a polarization axis of an incident side polarizing plate, optical axes of the first and second difference plates and a polarization axis of an outgoing side polarizing plate.

Relations among the polarization axis 25 of the incident side polarizing plate 11, the optical axis 27 of the first phase difference plate 12, the optical axis 28 of the second phase difference plate 13 and the polarization axis 26 of the outgoing side polarizing plate 15 shown in FIG. 7 are described in detail with reference to FIG. 9C. Referring to FIG. 9C, a plane 33 which is perpendicular to the primary illumination ray 24 emitted from the outgoing side polarizing plate 15 is defined in the vicinity of the outgoing side polarizing plate is. The paper surface of FIG. 9C is parallel to the X–Y plane, and the Z coordinate axis is perpendicular to the paper surface.

Projections of the polarization axis 25, the optical axes 27 and 28 and the polarization axis 26 in FIG. 7 are shown on the plane 33 in FIG. 9C. An arrow T1 represents the projection of the polarization axis 25 of the incident side polarizing plate 11, and an arrow S1 represents the projection of the optical axis 27 of the first phase difference plate 12. Moreover, an arrow S2 represents the projection of the optical axis 28 of the second phase difference plate 13, and an arrow T2 represents the projection of the polarization axis 26 of the outgoing side polarizing plate 15. The arrow T1 makes +45 degrees against the X coordinate axis, and the arrow S1 is coincident with the X coordinate axis. The arrow S2 is coincident with the Y coordinate axis, and the arrow T2 makes −45 degrees against the X coordinate axis. Consequently, the arrow T1 is different from the arrow T2 by 90 degrees, and the arrow S1 is different from the arrow S2 by 90 degrees. Furthermore, there are difference angles of 45 degrees between the arrows T1 and S1, between the arrows T1 and S2, between the arrows T2 and S1 and between the arrows T2 and S2.

Referring to FIG. 7, the primary illumination ray 24 becomes a linearly polarized light having 45 degrees of polarization angle with respect to the X coordinate axis after passing through the incident side polarizing plate 11. When the second phase difference plate 13 is parallel to the LC cell 14 (γ=0), the slow axis of the first phase difference plate 12 is coincident with the fast axis of the second phase difference plate 13. Since retardations Γ of both the phase difference plates 12 and 13 are equal, a phase difference given by the first phase difference plate 12 is offset by the second phase difference plate 13. Therefore, no phase difference is caused in the primary illumination ray 24.

In case the second phase difference plate 13 is slanted with respect to the LC cell 14, a phase difference is caused in the primary illumination ray 24 as described hereafter. A phase difference $\delta_1(\delta_1>0)$ arises in the primary illumination ray 24 by the first phase difference plate 12 as expressed the following by equation (11):

$$\delta_1 = \frac{2\pi \cdot (N_s - N_f) \cdot D}{\lambda} . \qquad (11)$$

The phase difference $\delta_1$ is defined by a lead of phase of the oscillation component in the Y coordinate axis direction with respect to the oscillation component of the X coordinate axis direction. If the phase difference is negative, the phase of the oscillation component in the Y coordinate axis direction lags.

In a similar manner, the slanted second phase difference plate 13 causes a phase difference $\delta_2(\delta_2<0)$ expressed by equation (12) to the primary illumination ray 24.

$$\delta_2 = -\frac{2\pi \cdot (N_s' - N_f) \cdot D}{\lambda \cdot \cos\phi} \quad (12)$$

In equation (12), the refractive index $N_s'$ in the direction of slow axis is shown in the equation (10). The angle $\phi$ is an angle between the plane which is perpendicular to the primary illumination ray 24 passing through the second phase difference plate 13 and the optical axis 28 of the second phase difference plate 13. Considering refraction of the primary illumination ray 24 at the boundary face of the second phase difference plate 13, the angle $\phi$ is not coincident with the angle $\gamma$. However, it is obvious that the angle $\phi$ is varied in correlation with the angle $\gamma$ by the known Snell's law.

The phase difference caused by the first phase difference plate 12 and the second phase difference plate 13 is a sum of the phase difference $\delta_1$ and the phase difference $\delta_2(\delta_1+\delta_2)$, and the absolute value of the phase difference $\delta_1$ is larger than that of the phase difference $\delta_2(|\delta_1|>|\delta_2|)$. Therefore, the sum of the phase differences $\delta_1$ and $\delta_2$ is a positive value $(\delta_1+\delta_2>0)$. Consequently, the first phase difference plate 12 and the second phase difference plate 13 equivalently serve as the phase difference plate of which the X coordinate axis is a slow axis. The equivalent phase difference is very small, and the phase difference is adjustable by changing the slant angle $\gamma$ of the second phase difference plate 13.

Subsequently, the primary illumination ray 24 emitted from the second phase difference plate 13 is applied to the LC cell 14. The liquid crystal 18 is approximately in the state shown in FIG. 4, and causes a small phase difference $\delta_0$ to the primary illumination ray 24. An equivalent direction of the slow axis of the liquid crystal 18 is approximately coincident with the direction of a projection of the major axis 30 of a crystal molecular 29 positioned in a central part of the liquid crystal 18. The projection is on a plane which is perpendicular to the primary illumination ray 24. The Y coordinate axis is approximately a slow axis with respect to the primary illumination ray 24. The small phase difference $\delta_0$ caused by the liquid crystal 18 becomes a negative value.

Consequently, if the retardations $\Gamma$ of the first and second phase difference plates 12 and 13 and the slant angle $\gamma$ of the second phase difference plate 13 are adequately selected, equation (13) is satisfied.

$$\delta_0+\delta_1+\delta_2+0 \quad (13).$$

When the equation (13) is satisfied, the primary illumination ray 24 emitted from the liquid crystal 18 in the black display state becomes a linearly polarized light. The polarization direction is approximately perpendicular to the polarization axis 26 of the outgoing side polarizing plate 15. Consequently, in comparison with lack of the first and second phase difference plates, a component of the primary illumination ray 24 emitted from the outgoing side polarizing plate 15 is significantly decreased. Namely, a small phase difference caused by the liquid crystal 18 is compensated by the first phase difference plate 12 and the second phase difference plate 13. Since the phase difference caused by the first phase difference plate 12 and the second phase difference plate 13 is very small, the influence given by the first and the second phase difference plates can be disregarded in the state that the liquid crystal cell 14 is driven so as to form a light optical image.

As mentioned above, according to the first embodiment of the liquid crystal light valve apparatus of the present invention, the contrast is improved with respect to the primary illumination ray 24. Even if the primary illumination ray 24 is not parallel to the Z coordinate axis, the configuration of the first embodiment is effectively applicable. In an actual LC cell, a plurality of light beams of various directions pass through a display region of the LC cell. The light beams have a certain range of wavelength. In application of the embodiment, a light beams having a predetermined wave length and passing in a predetermined direction is defined as the primary illumination ray which is representative of the plurality of light beams, and the above-mentioned condition for compensating the phase difference is made to meet with respect to the primary illumination ray. Consequently, a contrast of the LC cell is improved in practical use.

In the first embodiment, the polarization direction 25 of the incident side polarizing plate 11 and the polarizing direction 26 of the outgoing side polarizing plate 15 may be perpendicular to the rubbing directions 19 and 29, respectively. In this case, a similar effect to the above-mentioned case is attainable by effective rearrangement of the first phase difference plate 12 and the second phase difference plate 13.

[SECOND EMBODIMENT OF LIQUID CRYSTAL LIGHT VALVE APPARATUS]

FIG. 10 is a perspective view of the second embodiment of the liquid crystal light valve apparatus of the present invention. Referring to FIG. 10, an optical path between the incident side polarizing plate 11 and the LC cell 14 is configured by an "optical coupling". In the optical coupling, the optical path including a plurality of optical elements is filled with medium having the same refractive index as the material of the optical elements. A loss of light on boundary faces of the optical elements is reduced because there are no boundaries between air and the optical elements, and undesirable stray light caused by reflection on the boundary face is suppressed. In the optical system having the optical coupling, a passing direction of a light in the medium is coincident with a passing direction of light in the optical elements. It is not necessary that the reflective index of the medium is correctly coincident with the reflective index of the optical elements. The reflective index of a conventional optical element is about 1.5, and a sufficient effect is realizable by using the medium having a similar reflective index to the conventional optical element.

A concrete example of the optical coupling is described with reference to FIG. 10. In FIG. 10, a sealable chamber 35 is disposed between the incident side polarizing plate 11 and the incident side glass substrate 16 of the LC cell 14, and the first phase difference plate 12 and the second phase difference plate 13 are enclosed in the sealable chamber 35. Transparent silicone resin is filled in the sealable chamber 35. Such transparent silicone resin is liquid before injection, and after the injection, the liquid silicone resin hardens to gel like or rubber like silicone solid matter. In the case of the silicone resin, until hardening after the injection, the primary illumination ray 24 is applied and the slant angle $\delta$ of the second phase difference plate 13 is adjusted to an optimum value.

Ethyleneglycol, diethleneglycol and ethanol are usable for the medium of the optical coupling. Particularly, the ethyleneglycol and silicone resin are optically isotropic, and an undesirable phase difference does not cause the incident light. The optical isotropy mentioned above is satisfied in the silicone resin hardened in gel like. An example of the transparent silicone resin of gel like is "KE1051" manufactured by Shin-etsu Chemical industry (Ltd.).

In the second embodiment of the liquid crystal light valve apparatus shown in FIG. 10, in a manner similar to the first embodiment shown in FIG. 7, the phase of the primary illumination ray 24 is effectively compensated by suitably selecting the retardations Γ of the first phase difference plate 12 and the second phase difference plate 13 and the slant angle γ of the second phase difference plate 13.

Moreover, since the optical paths before and after of the first phase difference plate 12 and the second phase difference plate 13 are optically coupled, the following effects are obtained :

first, stray light caused by undesirable reflection on the optical boundary face is suppressed, and an optical image having a higher contrast is obtainable, second, a transmittance of the liquid crystal light valve apparatus is improved, and an optical image increased in light is formed, and third, since no reflection is caused on the optical boundary faces of the optical elements, the slant angle γ of the second phase difference plate 13 is relatively small, and a size of the liquid crystal light valve apparatus in the direction of optical axis may be decreased by the reduction of the slant angle γ.

Subsequently, as to the first embodiment and the second embodiment of the liquid crystal light valve apparatus, an optimum configuration is described. The equation (13) is revised by using the equations (10), (11) and (12), and hence an equation (14) is derived.

$$1 - K + \frac{K}{\cos\phi} - \frac{1}{\cos\phi} \times \frac{K}{\sqrt{\sin^2\phi + K^2\cos^2\phi}} = -\frac{\lambda\delta_0}{2\pi D N_s}. \quad (14)$$

In the equation (14), "ϕ" represents the angle between a plane which is perpendicular to the primary illumination ray 24 passing through the second phase difference plate 13 and the optical axis 28 of the second phase difference plate 13. In the first phase difference plate 12 and the second phase difference plate 13, a refractive index $N_s$ in the direction of the optical axis (slow axis) and a reflective index $N_f$ in the perpendicular direction (fast axis) to the optical axis are defined. Letter D represents the thickness of the film type retardation plate. Letter K represents the ratio of the refractive index $N_f$ to the refractive index $N_s$ ($K=N_f/N_s<1$). A phase difference $\delta_0$ caused by the liquid crystal is derived from equation (6) in the case of 45 degrees of the amplitude ratio angle α (α=45). The reference direction is set so that the phase difference $\delta_0$ becomes a negative, and is Identical with the X coordinate axis in this case. An ellipticity angle β is decided with respect to the primary illumination ray 24 emitted from LC cell 14 in the black display state without the first phase difference plate 12 and the second phase difference plate 13. Subsequently, the phase difference $\delta_0$ is set to twice of the ellipticity angle β ($\delta_0=2\beta$). The angle ϕ is calculated from the equation (14). The angle ϕ correlates to a slant angle of the second phase difference plate 13, and the phase difference caused by the LC cell is compensated by slanting the second phase difference plate 13 by the angle γ.

[THIRD EMBODIMENT OF LIQUID CRYSTAL LIGHT VALVE APPARATUS]

Figure 11:
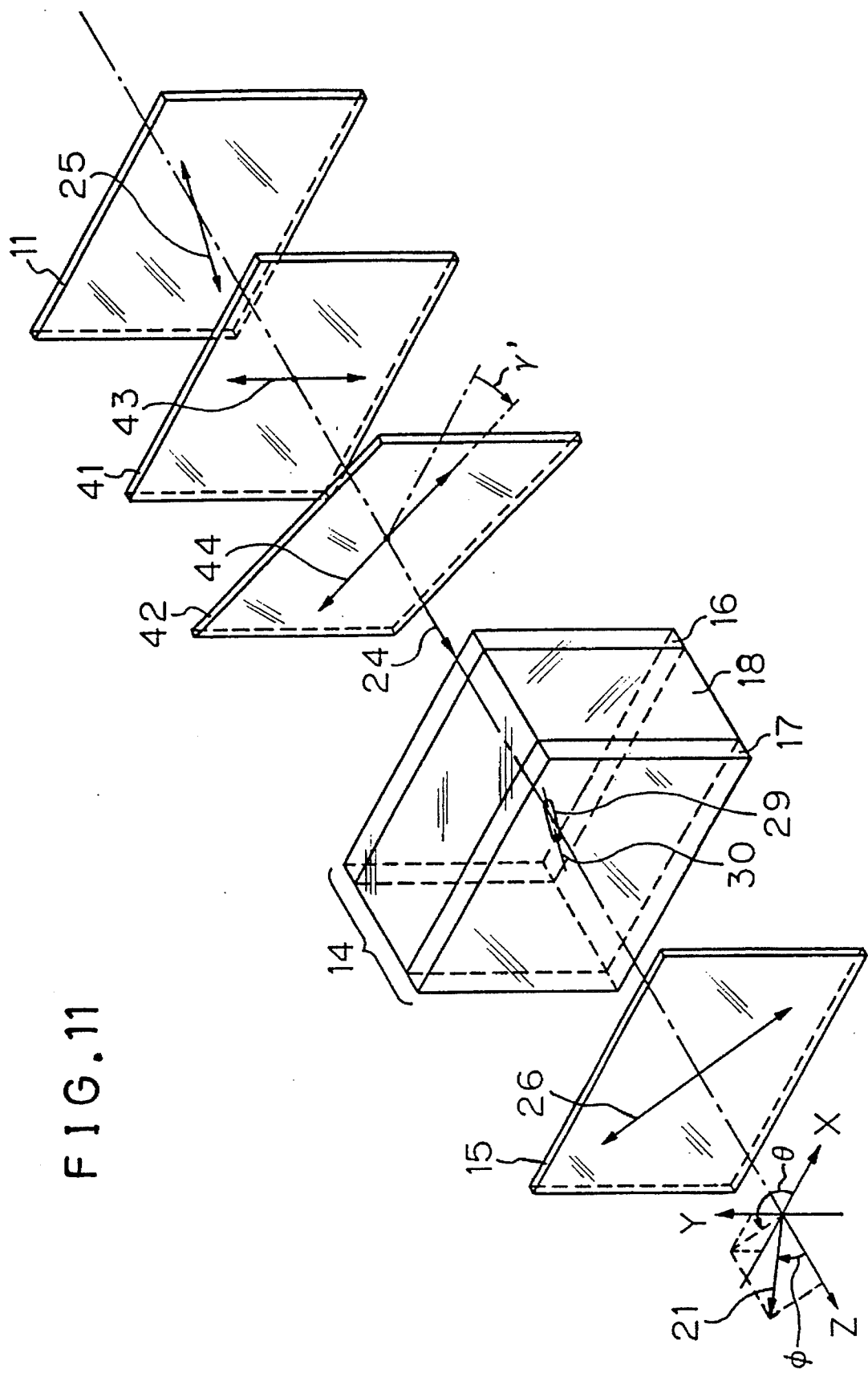
FIG. 11 is a perspective view of a liquid crystal light valve apparatus of a third embodiment of the present invention.

FIG. 11 is a perspective view of the third embodiment of the liquid crystal light valve apparatus of the present invention.

In the third embodiment, a first phase difference plate 41 and a second phase difference plate 42 may be retardation plates which are similar to a negative uniaxial crystal. Other elements except for the first phase difference plate 41 and the second phase difference plate 42 are similar to those in the first embodiment shown in FIG. 7, and are designated by like numerals as used with corresponding elements shown in FIG. 7. Therefore detailed description is omitted. The primary illumination ray 24 is monochromatic light.

The first phase difference plate 41 and the second phase difference plate 42 are film-shaped retardation plates fabricated by stretching transparent polystyrene. The stretched polystyrene film is adhered on a glass substrate by adhesive substance. Functions of the first phase difference plate 41 and the second phase difference plate 42 are described with reference to the index ellipsoid 50 shown in FIG. 8.

A stretched direction of the retardation plates for the first phase difference plate 41 and the second phase difference plate 42 is defined as a Z' coordinate axis, and the a thickness direction thereof is defined as Y' coordinate axis. Consequently, anisotropy of the refractive index is approximately expressed by $N_x=N_y>N_z$. Namely, the retardation plate is similar to a negative uniaxial crystal having the optical axis in the stretched direction. In this case, the refractive index becomes a minimum in the direction of the optical axis 51, and is designated by a refractive index $N_f$ in the fast axis direction. The refractive index becomes a maximum in a direction which is perpendicular to the optical axis 51, and is designated by a refractive index $N_s$ in the slow axis direction. Consequently, the refractive index $N_f$ is equal to the refractive index $N_z$ ($N_f=N_z$) and the refractive index $N_s$ is equal to the refractive index $N_x$ and the refractive index $N_y$ ($N_s=N_x=N_y$).

A phase difference of the light 52 passing through the origin 53 caused by the negative uniaxial crystal is similar to the case of a positive uniaxial crystal by exchanging the slow axis for the fast axis. For example, the path of the light 52 is on the Y'-Z' plane, and the slow axis which is maximum in the refractive index is in the direction 55 which is perpendicular to both the optical axis 51 and the path of the light 52. The maximum refractive index becomes the refractive index $N_s$ in the slow axis direction. The fast axis is in the direction 56 which is perpendicular to the slow axis on the plane 54, and the refractive index $N_f'$ in the fast axis direction is given by $$N_f' = \frac{N_f \cdot N_s}{\sqrt{N_f^2\sin^2\phi' + N_s^2\cos^2\phi'}}, \quad (15)$$

where, "ϕ'" designates an angle between the optical axis 51 and the plane 54 perpendicular to the light 52.

Referring to FIG. 11, operation of the first phase difference plate 41 and the second phase difference plate 42 is described. A predetermined electric field is applied to the liquid crystal 18, and a most dark optical image is formed. In the first phase difference plate 41 and the second phase difference plate 42, a refractive index in the direction of the optical axis (fast axis) is designated by $N_f$, a refractive index in a direction (slow axis) which is perpendicular to the optical axis is designated by $N_s$ and the thickness thereof is designated by D. A retardation Γ of the first phase difference plate 41 is identical with that of the second phase difference plate 42.

The first phase difference plate 41 is perpendicularly arranged with respect to the primary illumination ray 24, and the optical axis 43 is coincident with the Y coordinate axis. The second phase difference plate 42 is perpendicularly arranged with respect to the primary illumination ray 24 and the optical axis 44 is coincident with the X coordinate axis. Subsequently, the second phase difference plate 42 is rotated at the Y coordinate axis by an angle γ. The optical axis 44 is parallel to the X-Z plane.

When the optical axis 44 of the second phase difference plate 42 is coincident with the direction of the X coordinate axis ($\gamma'=0$), the fast axis of the first phase difference plate 41 and the slow axis of the second phase difference plate 42 are in coincidence with respect to the primary illumination ray 24. Since the retardation $\Gamma$ of both the first and second phase difference plates 41 and 42 are identical, a phase difference caused by the first phase difference plate 41 is canceled by a phase difference caused by the second phase difference plate 42, and a phase difference does not arise in the primary illumination ray 24.

A phase difference of the primary illumination ray 24 caused by the slanted second phase difference plate 42 is described below. First, the first phase difference plate 41 gives a phase difference $\delta_1'(>0)$ expressed by equation (16) to the primary illumination ray 24. As mentioned above in the first embodiment, the phase difference is defined as a lead of the phase of the oscillation component in the Y coordinate axis with respect to the phase of the oscillation component in the X coordinate axis.

$$\delta_1' = \frac{2\pi \cdot (N_s - N_f) \cdot D}{\lambda} \quad (16)$$

Subsequently, the slanted second phase difference plate 42 gives a phase difference $\delta_2'$ (<0) expressed by equation (17) to the primary illumination ray 24.

$$\delta_2' = -\frac{2\pi \cdot (N_s - N_f') \cdot D}{\lambda \cdot \cos\phi'} \quad (17)$$

he refractive index $N_f'$ in the direction of the fast axis is expressed by equation (15). An angle $\phi'$ is the angle between the optical axis 44 and the plane which is perpendicular to the primary illumination ray 24 passing through the second phase difference plate 42.

A phase difference caused by the first phase difference plate 41 and the second phase difference plate 42 is a sum of the phase differences $\delta_1'$ and $\delta_2'$ ($\delta_1'+\delta_2'$), and the absolute value of the phase difference $\delta_1'$ is larger than that of the phase difference $\delta_2'$. Therefore, the sum of the phase differences $\delta_1'$ and $\delta_2'$ is a positive value. Consequently, the first phase difference plate 41 and the second phase difference plate 42 equivalently serve as the phase difference plate of which the X coordinate axis is a slow axis.

Therefore, if the retardations $\Gamma$ of the first phase difference plate 41 and the second phase difference plate 42 and a slant angle $\gamma'$ of the second phase difference plate 42 are adequately selected, equation (18) is satisfied. The phase difference $\delta_0$ is caused by the LC cell 14.

$$\delta_0'+\delta_1'+\delta_2'=0 \quad (18)$$

If the equation (18) is satisfied, the primary illumination ray 24 emitted from the liquid crystal 18 in the black display state becomes a linearly polarized light.

In the third embodiment, in a similar manner to the second embodiment, the optical paths before and after of the first phase difference plate 41 and the second phase difference plate 42 may be configured by the optical coupling.

In the third embodiment, equation (19) representing an optimum configuration of the liquid crystal light valve apparatus is obtained by rewriting the equation (18) by using the equations (15), (16) and (17). When the equation (19) is satisfied, the phase difference of the primary illumination ray 24 is compensated with a high accuracy.

$$K'-1-\frac{K'}{\cos\phi'}+\frac{1}{\cos\phi'} \times \quad (19)$$

-continued $$\frac{K'}{\sqrt{\sin^2\phi' + K'^2\cos^2\phi'}} = -\frac{\lambda\delta_0}{2\pi DN_f}.$$

In the equation (19), Greek letter $\phi'$ represents an angle between the optical axis 44 of the second phase difference plate 42 and a plane which is perpendicular to the primary illumination ray 24 passing through tile second phase difference plate 42. In the first phase difference plate 41 and the second phase difference plate 42, a refractive index $N_f$ represents the refractive index in the direction of the optical axis (fast axis), a refractive index $N_s$ represents the refractive index in the direction (slow axis) perpendicular to the optical axis, letter D represents a thickness of the film-like retardation plate and letter K' represents a ratio of $N_s$ to $N_f$ ($K'=N_s/N_f$) (>1)). A phase difference $\delta_0$ is caused by the liquid crystal, and is similar to that in the equation (14).

[PREFERABLE EXAMPLE OF SECOND EMBODIMENT]

In the case that a phase difference plate which is similar to a positive uniaxial crystal in function is used for the first phase difference plate and the second phase difference plate, the liquid crystal light valve apparatus is configured in a manner similar to the second embodiment shown in FIG. 10, for example.

Referring to FIG. 10, a slant direction of the second phase difference plate 13 is selected as will be described hereafter. Namely, the second phase difference plate 13 is slanted so that an angle between the normal line 36 of the second phase difference plate 13 and the major axis 30 of the liquid crystal molecular 29 positioned in the central part of the liquid crystal layer 18 in the black display state decreases. Consequently, the contrast in the monochromatic display of the LC cell 14 is effectively improved.

Figure 12:
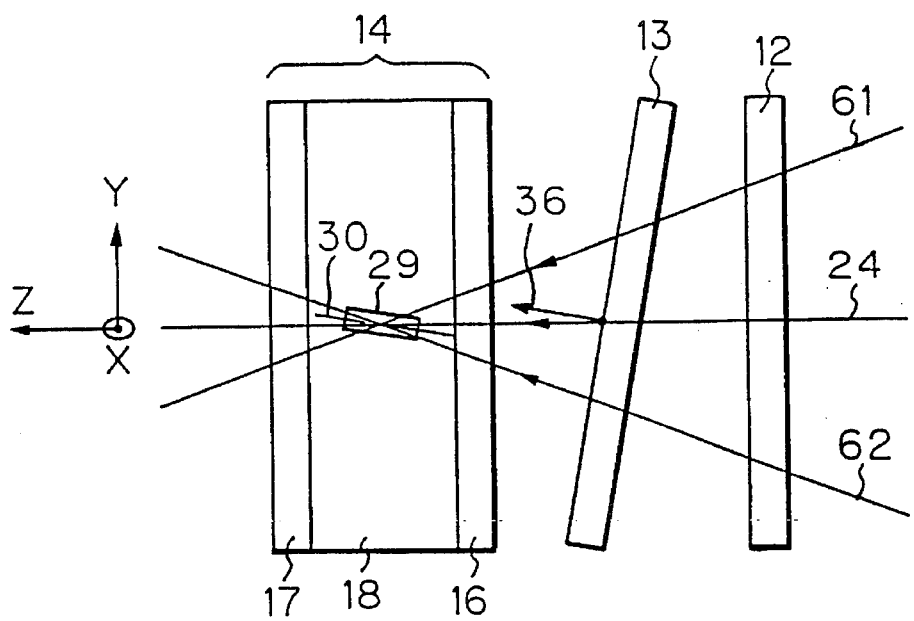
FIG. 12 is a side view of a liquid crystal panel illustrating arrangement of a liquid crystal cell and phase different plates in the direction of X coordinate axis.
Figure 13:
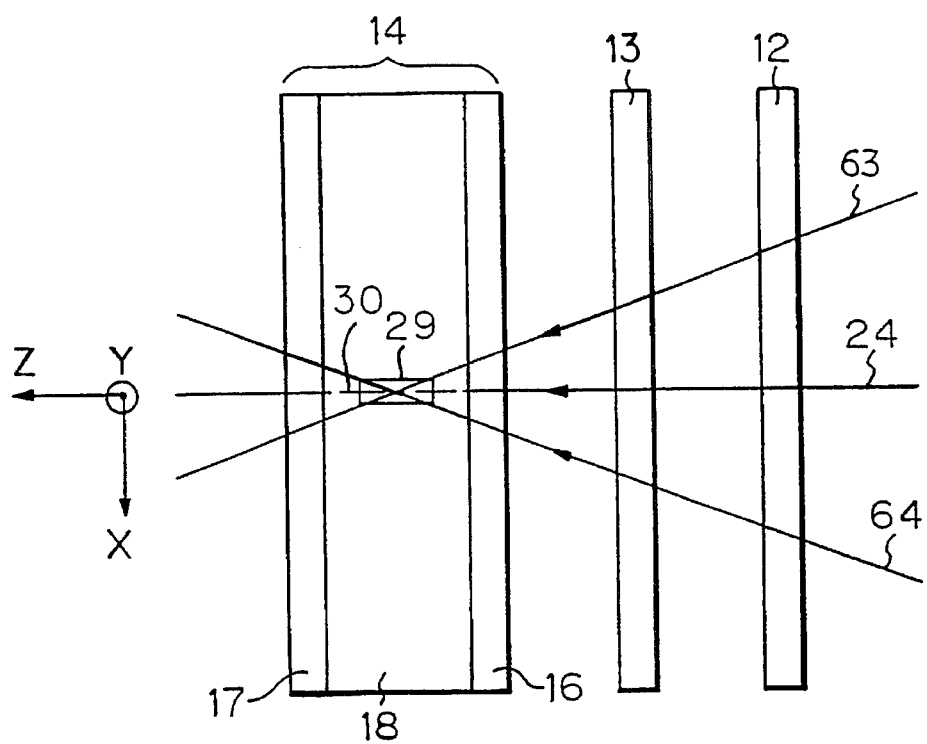
FIG. 13 is a side view of a liquid crystal panel illustrating arrangement of the liquid crystal cell and the phase different plates in the direction of Y coordinate axis.

The reason is described with reference to FIG. 12 and FIG. 13. FIG. 12 is a side view observed in the direction of the X coordinate axis in FIG. 10. FIG. 13 is a plan view observed in the direction of the Y coordinate axis in FIG. 10. In FIG. 12 and FIG. 13, only the LC cell 14, the first phase difference plate 12 and the second phase difference plate 13 are illustrated. The assumption is made that the LC cell 14, the first phase difference plate 12 and the second phase difference plate 13 are enclosed in medium having a similar refractive index to the first phase difference plate 12 and the second phase difference plate 13, and refraction of light at respective boundary faces can be disregarded.

Referring to FIG. 12 and FIG. 13, the primary illumination ray 24 and light beams 61, 62, 63 and 64 passing in respective directions with angles with respect to the primary illumination ray 24 intersect with the primary illumination ray 24 at the center of the liquid crystal layer. For the simplicity, a liquid crystal molecular 29 positioned at the center of the liquid crystal layer is representative of liquid crystal in the black display state. Such approximation is appropriate to describe the operation of the liquid crystal.

Viewing angle dependence characteristics in phase difference given by the liquid crystal 18 in the black display state is described hereafter. A viewing angle is defined as an angle between the primary illumination ray 24 and a light beam keeping attention. The major axis 30 of the liquid crystal molecular 29 is approximately parallel to the X–Z plane and is different from the Z coordinate axis by a predetermined angle. The direction of the major axis 30 is determined by a rubbing direction of the alignment films in the LC cell 14. Referring to FIG. 13, the liquid crystal molecular 29 causes an identical phase difference to the light 63 and the light 64 passing in the parallel direction of the X–Z plane. The phase differences of the light 63 and the light 64 are substantially symmetry and are identical in magnitude. On the contrary, referring to FIG. 12, a phase difference of the light 61 passing in the parallel direction of the Y–Z plane is larger than a phase difference of the light 62. The viewing angle dependence characteristics of phase difference caused by the liquid crystal 18 has symmetricalness with respect to the primary illumination ray 24. The symmetricalness is higher on the X–Z plane than that on the Y–Z plane. This is understood with reference to the view angle dependence characteristic of contrast shown in FIG. 5, because the viewing angle dependence characteristics of phase difference is similar to the viewing angle dependence characteristics of contrast.

Subsequently, in the viewing angle dependence characteristics of phase difference given by the phase difference plates 12 and 13, the first phase difference plate 12 and the second phase difference plate 13 give the same phase difference to the light 63 and the light 64 having the same incident angle with respect to the primary illumination ray 24. Consequently, the symmetricalness is improved in a direction along the X–Z plane. On the other hand, the second phase difference plane 13 slanted by rotating at the X coordinate axis gives phase differences which are different in magnitude to the light 61 and the light 62 which are different in the incident angles. Consequently, the symmetricalness is lower in a direction along the Y–Z plane.

By considering the symmetricalness of the viewing angle dependence characteristics, it is desirable that the slant direction of the second phase difference plate 13 is coincident with a direction having low symmetricalness of the viewing angle dependence characteristic of phase difference given by the liquid crystal 18. For this purposes, use of a phase difference plate which is similar to a positive uniaxial crystal is preferable to use of a phase difference plate which is similar to a negative uniaxial crystal. It is apparent by comparing the configuration of the first and second embodiments shown in FIGS. 9 and 10 with the configuration of the third embodiment shown in FIG. 11. A conventional liquid crystal which is employed in an actual LC cell is similar to the positive uniaxial crystal.

Moreover, the viewing angle dependence characteristics of the liquid crystal 18 is satisfactorily correlated with the viewing angle dependence characteristics of the first and second phase difference plates 12 and 13 by selecting a slant angle of the second phase difference plate 13 by considering a magnitude of a phase difference given by the liquid crystal 18 on the Y–Z plane. Namely, the first and second phase plates 12 and 13 are arranged so as to give a larger phase difference to the light 62 rather than the light 61. For example, the second phase difference plate 13 is slanted so that an angle between the normal line 36 of the second phase difference plate 13 and the major axis 30 of the liquid crystal molecular 29 is substantially zero degrees.

By the above-mentioned configuration, the viewing angle dependence characteristics of phase difference given by the liquid crystal 18 in the black display plate is satisfactorily correlated with the viewing angle dependence characteristic of phase differences given by the first phase difference plate 12 and the second phrase difference plate 13. Consequently, an error in phase compensation is minimized with respect to the light passing in the direction having an angle to the primary illumination ray, and the contrast is improved in a wide range of viewing angle. Furthermore, symmetricalness of the viewing angle dependence characteristic of contrast is improved in the light emitted from the liquid crystal light valve apparatus.

[FIRST EMBODIMENT OF LIQUID CRYSTAL LIGHT VALVE APPARATUS OF PROJECTION TYPE]

Figure 14A:
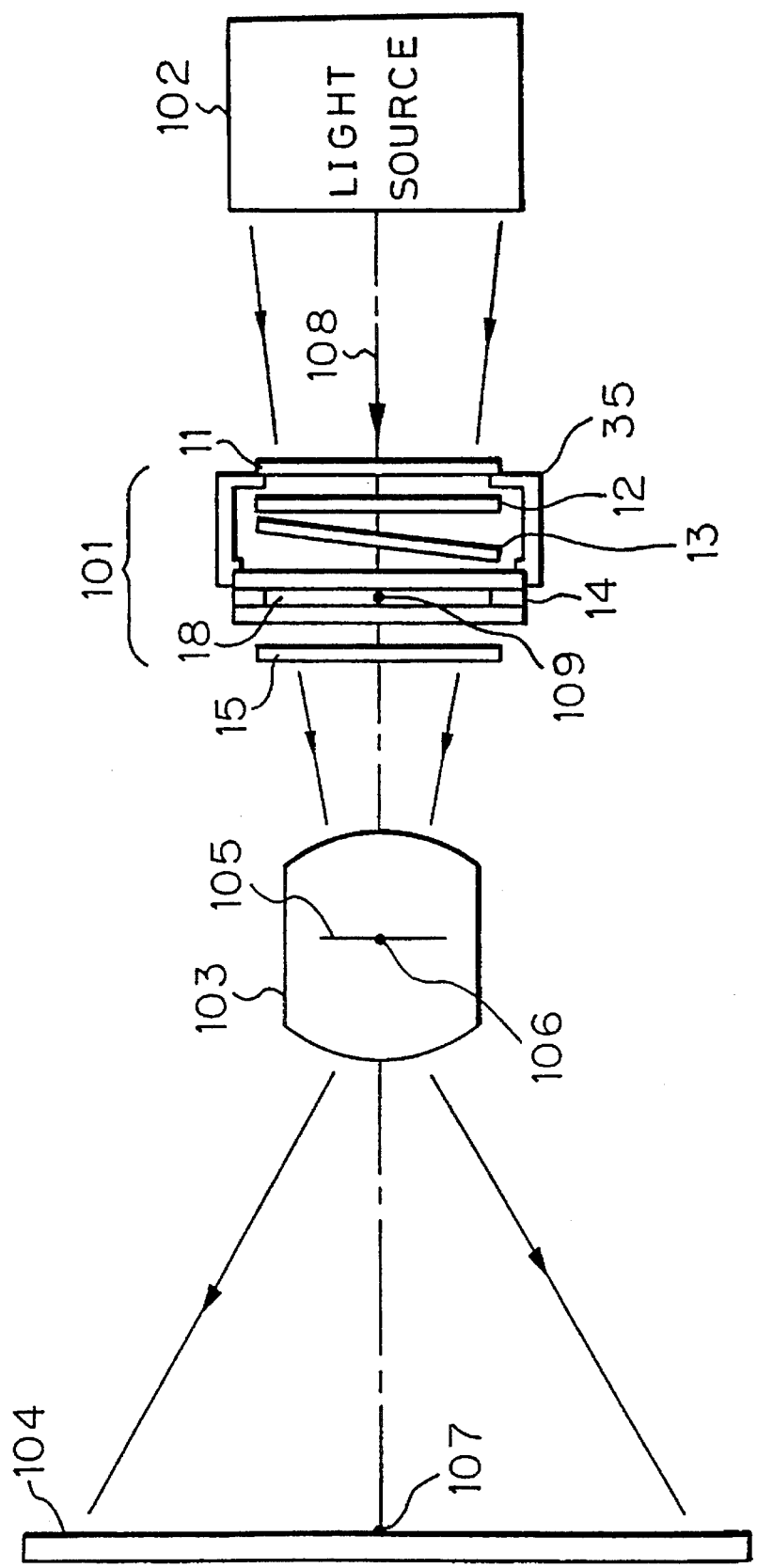
FIG. 14A is a side view of a first embodiment of a liquid crystal light valve apparatus of projection type of the present invention.

FIG. 14A is a side view of the first embodiment of the liquid crystal light valve apparatus of projection type using the LC panel of the present invention.

A liquid crystal light valve apparatus 101 is substantially identical with the liquid crystal light valve apparatus shown in FIG. 10, and comprises the incident side polarizing plate 11, the first phase difference plate 12, the second phase difference plate 13, the LC cell 14 and the outgoing side polarizing plate 15. The sealable chamber 35 is disposed between the incident side polarizing plate 11 and the LC cell 14, and ethylene glycol is filled in the sealable chamber 35. An optical image formed on the liquid crystal light valve apparatus 101 is illuminated by a light source 102, and is enlarged and projected on a screen 104 through a projection lens 103.

A primary illumination ray 108 passes the gravity center of 109 of the display area of the liquid crystal light valve apparatus 101 and the center of gravity 106 of an entrance pupil 105 of the projection lens 103, and is applied to the center of gravity 107 of a screen 104. The primary illumination ray 108 passes along a normal line of the LC cell 14 and the optical axis of the projection lens 103.

The liquid crystal light valve apparatus 101 is configurated so that the phase difference is satisfactorily compensated with respect to the primary illumination ray 108 passing through the LC cell 14 in the black display state. Namely, the slant angle of the second phase difference plate 13 is adjusted so that a darkest image is project on the screen 104 in the black display state. Consequently, a monochromatic image improved in contrast may be projected on the screen 104.

It is desirable that the projection lens 103 is high in telecentric characteristic. In the projection lens 103 having the high telecentric characteristic, the projection lens 103 is designed in a manner that a principal ray with respect to an object at a position deviated from the optical axis of the projection lens passes through the projection lens 103 in parallel to the optical axis. Namely, the principal rays passing through out of the optical axis are parallel to the optical axis. By using the projection lens having the high telecentric characteristics, condition for compensating the phase difference with respect to the primary illumination ray 108 passing through the center of gravity 109 of the LC cell 14 is satisfied with respect to the primary rays passing through every place of the LC cell 14. Consequently, the contrast in the monochromatic display is satisfactorily improved in the entire area of the projected image.

Figure 1:
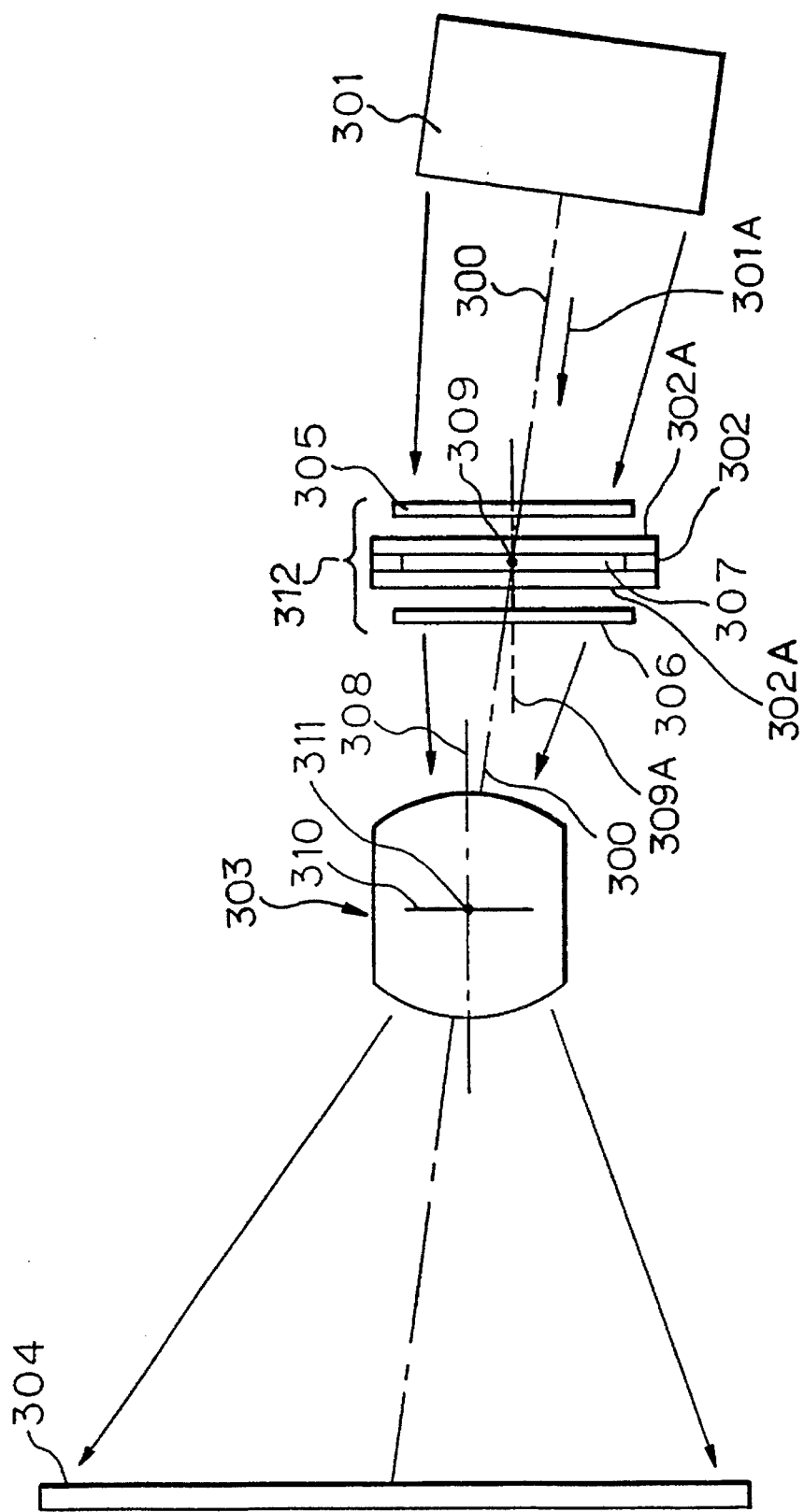
FIG. 1 is the side view of the liquid crystal light valve apparatus of projection type in the prior art.

In the liquid crystal light valve apparatus 101, the contrast is improved with respect to the incident light in the normal line direction of the LC cell 14, and the symmetricalness of the viewing angle dependence characteristic of contrast is improved with respect to the normal line. Therefore, even if the center of gravity 109 of the display area of the liquid crystal light valve apparatus 101 is set on the optical axis of the projection lens 103, a projection image improved in contrast is realizable. In the first embodiment of the liquid crystal light valve apparatus of projection type, the projection lens 103 having a smaller viewing angle in comparison with the projection lens 303 in FIG. 1 is usable, and it is great advantage in configuration of the liquid crystal light valve apparatus of projection type. Moreover, the projected image is uniform in the distribution of brightness.

In the embodiments described above, the primary illumination ray is a single wavelength light of a wavelength $\lambda$. In general, a light applying to the liquid crystal light valve apparatus has a predetermined wavelength band. Therefore, error of compensation in the phase difference arises with respect to the light having a different wavelength from the wavelength λ, but the effect of the above-mentioned embodiment is realizable by compensating the phase difference with respect to the wavelength λ which is representative of the wavelength band of the illumination light. For example, in the liquid crystal light valve apparatus for applying a light of the entire range of visible light, it is desirable that the phase difference is satisfactorily compensated with respect to the light having the wavelength of about 540 nm which is relatively higher in spectral luminous efficacy.

Figure 14B:
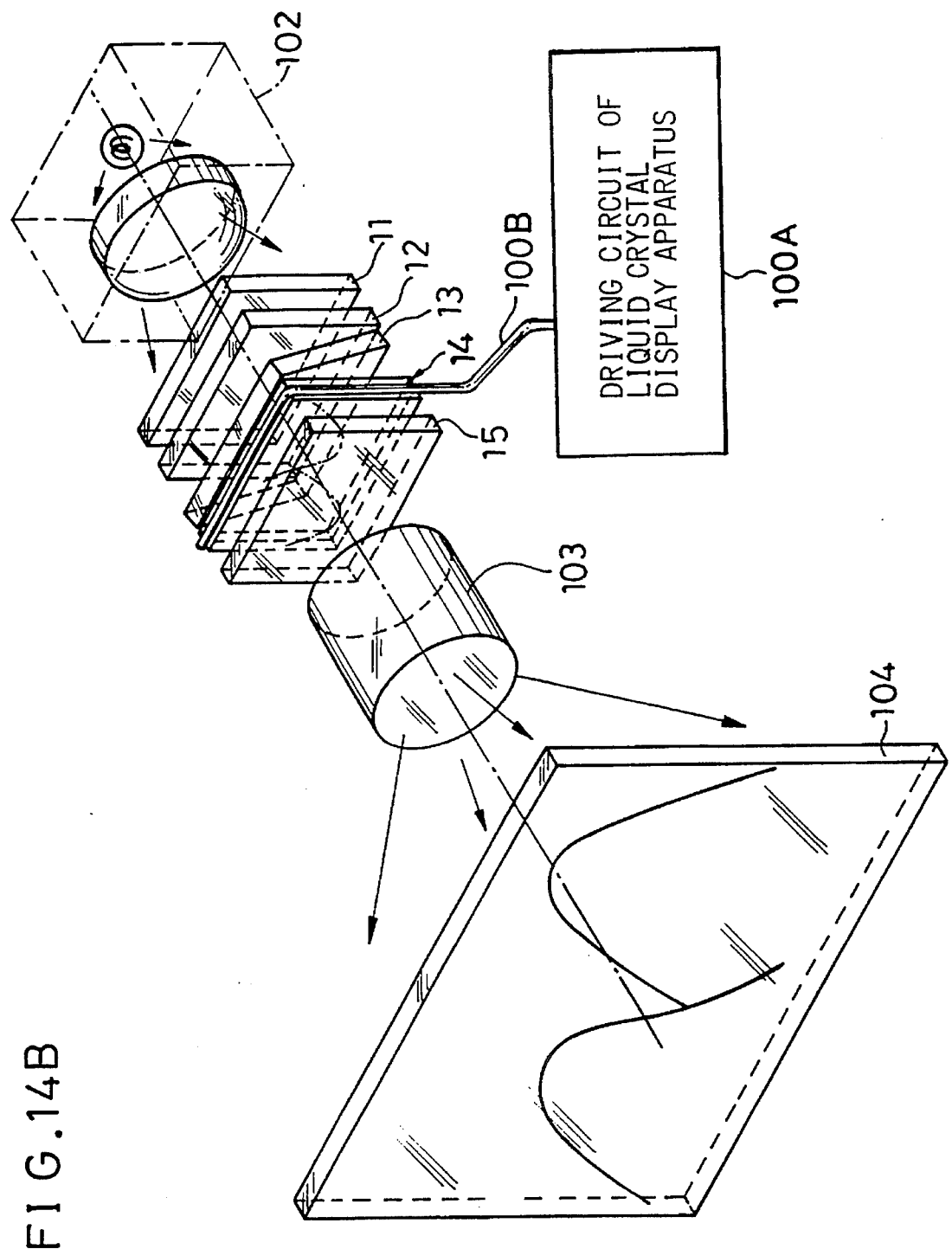
FIG. 14B is a perspective view of the first embodiment of the liquid crystal light valve apparatus of projection type of the present invention.

FIG. 14B is a perspective view of an example of the liquid crystal display apparatus of projection type. In FIG. 14B, a voltage of an image signal is applied to each pixel (not shown) of the LC cell by a driving circuit of liquid crystal display apparatus 100A through a connection cable 100B. The light beam emitted from a light source 102 is controlled by the LC cell 14 in compliance with the image signal and is projected on the screen 14 through the projection lens 103.

[SECOND EMBODIMENT OF THE LIQUID CRYSTAL LIGHT VALVE APPARATUS OF PROJECTION TYPE]

Figure 15:
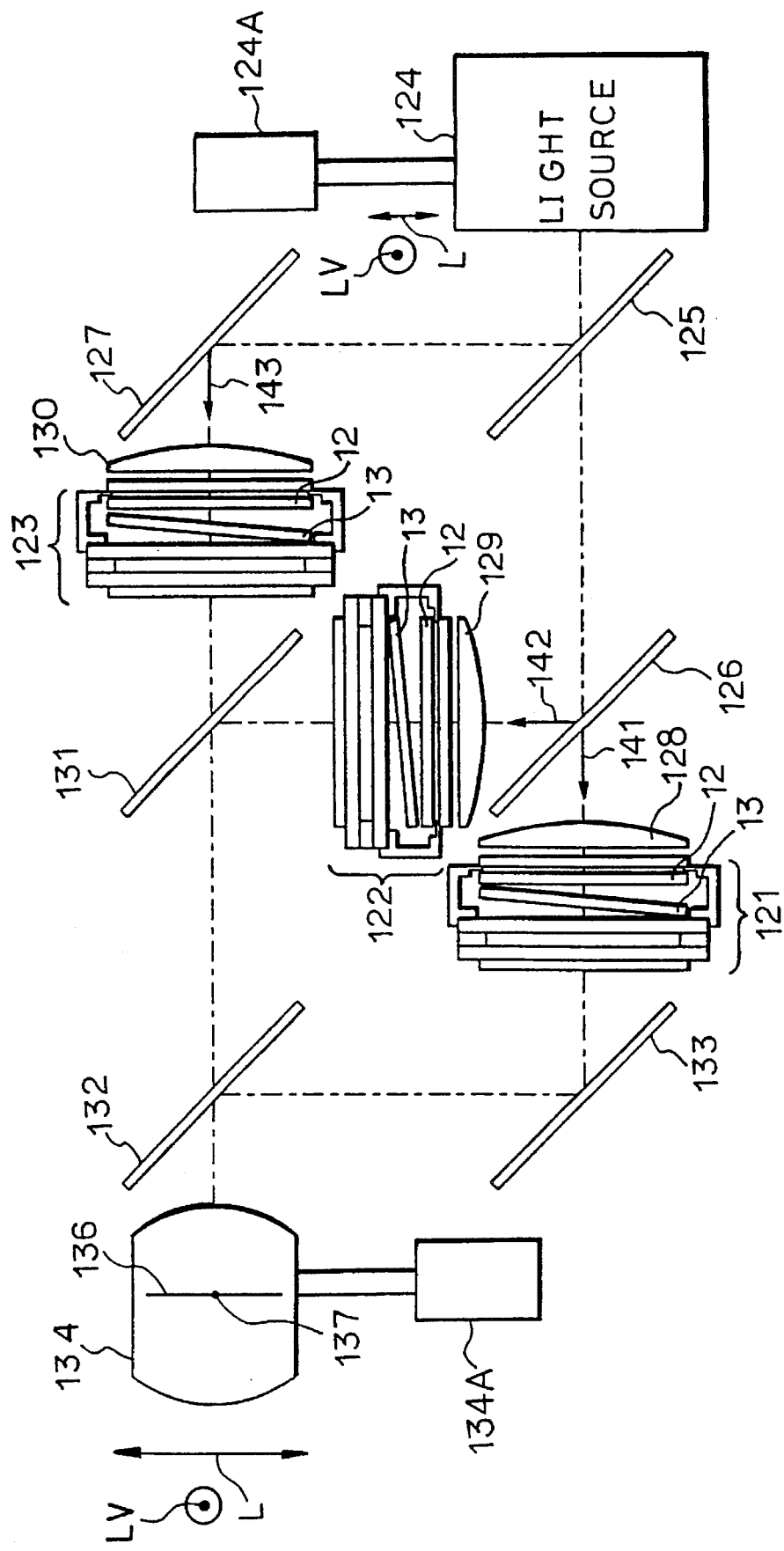
FIG. 15 is a side view of a second embodiment of a liquid crystal light valve apparatus of projection type of the present invention.

FIG. 15 is a side view of the second embodiment of the liquid crystal light valve apparatus of projection type using the LC panel of the present invention.

The second embodiment is directed to a full color liquid crystal light valve apparatus of projection type, and three liquid crystal light valve apparatus corresponding to three primary colors are used. Since, the illumination light of a liquid crystal light valve apparatus of the three primary colors is limited to a specified primary color light, the wavelength range of the light passing through the liquid crystal light valve apparatus is narrowed. Since, the phase difference is compensated with respect to the specified primary color light having the narrowed wavelength range, the error of compensation may be reduced in the wavelength range of the light, and the contrast of the projected image is improved.

Referring to FIG. 15, a light emitted from the light source 124 is divided into the three primary color digits of red, green and blue by dichroic mirrors 125 and 126. The three primary color digits are applied to respective liquid crystal light valve apparatus 121, 122 and 123. A plane mirror 127 serves to bend the light path to the liquid crystal apparatus 123. The light beams of three primary colors are applied to the respective liquid crystal light valve apparatus 121, 122 and 123 through convergent lenses 128, 129 and 130, respectively. These lenses 128, 129 and 130 are called field lenses. The optical images of three primary colors of the liquid crystal light valve apparatus 121, 122 and 123 are combined by dichroic mirrors 131 and 132 and a plane mirror 133, and an optical image of full color is projected on a screen (not shown).

Three primary illumination rays 141, 142 and 143 having respective wavelengths of which each is representative of each primary color are defined at the liquid crystal light valve apparatus 121, 122 and 123, respectively. The primary illumination rays 141, 142 and 143 are applied to the center of gravity 137 of the entrance pupil 136 of the projection lens 134 through the path along the optical axis of the light source 124, the centers of gravity of the respective liquid crystal light valve apparatus 121, 122 and 123, the optical axes of the field lenses 128, 129 and 130 and the optical axis of the projection lens 134.

The liquid crystal light valve apparatus 121, 122 and 123 are those of the embodiment shown in FIG. 10, and the phase differences in the black display state are satisfactorily compensated with respect to the respective primary illumination rays 141, 142 and 143. Since the primary illumination rays 141, 142 and 143 are different in wavelength, the condition of compensation of the phase differences are different, but the phase compensation which is suitable to the respective wavelengths are realizable by adjusting the slant angles of the respective second phase difference plates. Consequently, the optical image having good contrast is realized with respect to the three primary color lights, and a high quality full color image having superior contrast is realizable.

In FIG. 15, for example, the liquid crystal light valve apparatus 121 is used for the green light, the liquid crystal light valve apparatus 122 is used for the red light and the liquid crystal light valve apparatus 123 is used for the blue light. In this case, the dichroic mirror 125 reflects the blue light, the dichroic mirrors 126 and 131 reflect the red light and the dichroic mirror 132 reflects the green light. The wavelength of the primary illumination ray 141 is representative of the green light and is 540 nm, for example. The wavelength of the primary illumination ray 142 is representative of the red light and is 610 nm, for example. The wavelength of the primary illumination ray 143 is representative of the blue light and is 490 nm, for example.

A projection lens having a small field angle is usable for the projection lens 134, and a projection image having a uniform lightness and is light in the peripheral portion is obtainable. The liquid crystal light valve apparatus 121, 122 and 123 may be structured by the same components, and thus a fabrication cost is reduced.

[THIRD EMBODIMENT OF THE LIQUID CRYSTAL LIGHT VALVE APPARATUS OF PROJECTION TYPE]

In the second embodiment of the liquid crystal light valve apparatus of projection type as shown in FIG. 15, it desirable that the projection lens 134 is movable in a perpendicular direction to the optical axis. In this case, since an optical image may be obliquely projected on the screen by an arbitrary angle, the liquid crystal light valve apparatus of projection type may be installed at an arbitrary position with respect to the screen. In the above-mentioned case, the contrast of the optical image may be kept to a high value by configurating the liquid crystal light valve apparatus as the third embodiment will be described below.

In the third embodiment of the liquid crystal light valve apparatus of projection type, in FIG. 15, the projection lens 134 is moved in a direction perpendicular to the optical axis of the projection lens 134 by a moving device 134A as shown by an arrow L or an arrow LV which is perpendicular to the paper surface. The light source 124 is also moved in the direction shown by the allow L in compliance with the movement of the projection lens 134 by a moving device 124A. The projection lens 134 may be moved in the direction shown by an arrow LV perpendicular to the paper surface of FIG. 15 by the moving device 134A. In this case, the light source 124 is also moved in the direction shown by the arrow LV perpendicular to the paper surface by the moving device 124A. The light source 124 is moved so that the optical axis of the emitted light from the light source 124 is always applied to the center of gravity 137 of the entrance pupil 136 of the projection lens 134. Consequently, a loss of light caused by moving of the projection lens 134 is suppressed, and a light optical image may be projected on the screen.

On the other hand, when the light source 124 is moved, passing directions of the primary illumination rays 141, 142 and 143 are changed. The primary illumination rays 141, 142 and 134 pass along the optical axis of the light source 124, and are applied to a center of gravity 137 of the entrance pupil 136 of the projection lens 134 through the center of gravity of the display area of the liquid crystal light valve apparatus, and in general, when the passing directions of the primary illumination rays 141, 142 and 143 are changed, the contrast of the optical image is decreased.

In order to resolve the above-mentioned problem, the arrangement of at least one of the first phase difference plate 12 and the second phase difference plate 13 may be changed in the respective liquid crystal light valve apparatus 121, 122 and 123. In an actual apparatus, the first phase difference plate 12 and the second phase difference plate 13 are mounted on respective mechanism for slanting in an arbitrary direction and by an arbitrary angle. The phase difference is compensated in accordance with change of the path of the primary illumination ray by adjusting the direction and angle thereof. Consequently, a projection image having a satisfactory contrast is realized in the monochromic display.

In each embodiment of the liquid crystal light valve apparatus of projection type, a metal halide lamp, a xenon lamp or a tungsten halogen lamp is usable for the light source 124. The light emitted from the lamp is converged by a suitable lens or a concave mirror to form the illumination ray.

[RESULT OF EXPERIMENT OF SECOND EMBODIMENT OF LIQUID CRYSTAL LIGHT VALVE APPARATUS]

In the second embodiment of the liquid crystal light valve apparatus shown in FIG. 10, experiment is performed by using green light of which the intensity is large in the vicinity of 540 nm of wavelength.

Referring to FIG. 10, the incident side polarizing plate 11 and the outgoing side polarizing plate 15 are structured by adhering a film retardation plate on a glass substrate. The film retardation plate is made by stretching polyvinyl alcohol resin absorbed iodine. In the case that only the incident side polarizing plate 11 and outgoing side polarizing plate 15 are disposed, the contrast is about 1000. The contrast is defined by a ratio of the light intensity in the state that the polarization axis 25 is parallel to polarization axis 26 to a light intensity in the state that the polarization axis 25 is perpendicular to the polarization axis 26.

On the other hand in the case that the first and second phase difference plates 12 and 13 are disposed between the LC cell 14 and the incident side polarizing plate 11, is described hereafter. The first and second phase difference plates 12 and 13 are structured by adhering a retardation plate on a glass substrate. The retardation plate is formed by stretching a transparent film of polycarbonate resin. These phase difference plates are similar to a positive uniaxial crystal having an optical axis in the direction along the film surface. The refractive index $N_s$ in the direction of the optical axis (slow axis) is about 1.589, the refractive index $N_f$ in the direction of the fast axis is about 1.582. The thickness D of the retardation plate is selected so that the retardation $\Gamma$ is 200 nm. The values of the above-mentioned refractive indexes $N_s$ and $N_f$ are in the wavelength of 540 nm.

The LC cell 14 is structured by a conventional material of TN-LC. The thickness of the liquid crystal layer 18 is 5 micron, and when the electric field is not applied, the LC cell 14 is in the white display state. On the other hand, when a driving voltage of about 6 volts is applied thereto, the LC cell 14 is in the black display state. In absence of the first and second phase difference plates 12 and 13, an ellipticity angle β of the primary illumination ray 24 emitted from the LC cell 14 in the black display state is about 1 degrees. The contrast is about 600 with respect to the primary illumination ray. The contrast in this case is represented by a ratio of the light intensity in the white display state to the light intensity in the black display state. The viewing angle dependence characteristic of contrast in this case is similar to that shown in FIG. 5, and is deviated in a specified direction.

Subsequently, a liquid crystal light valve apparatus of projection type is composed of the liquid crystal light valve apparatus having no phase difference plates. A projection lens of F-number 4 is used. The contrast on the central part of a screen is about 200.

Subsequently, as shown in FIG. 10, the first phase difference plate 12 and the second phase difference plate 13 are arranged between the incident side polarizing plate 11 and the LC cell 14. The optical path between the incident side polarizing plate 11 and the glass substrate 16 of the LC cell 14 is filled with ethylene glycole for optical coupling. The second phase difference plate 13 is slanted by 10 degrees ($\gamma$=10). Consequently, the light intensity in the black display state becomes minimum with respect to the primary illumination ray 24. In this state the contrast is 900 with respect to the primary illumination ray 24. As mentioned above, the contrast is increased from 600 to 900.

Figure 16:
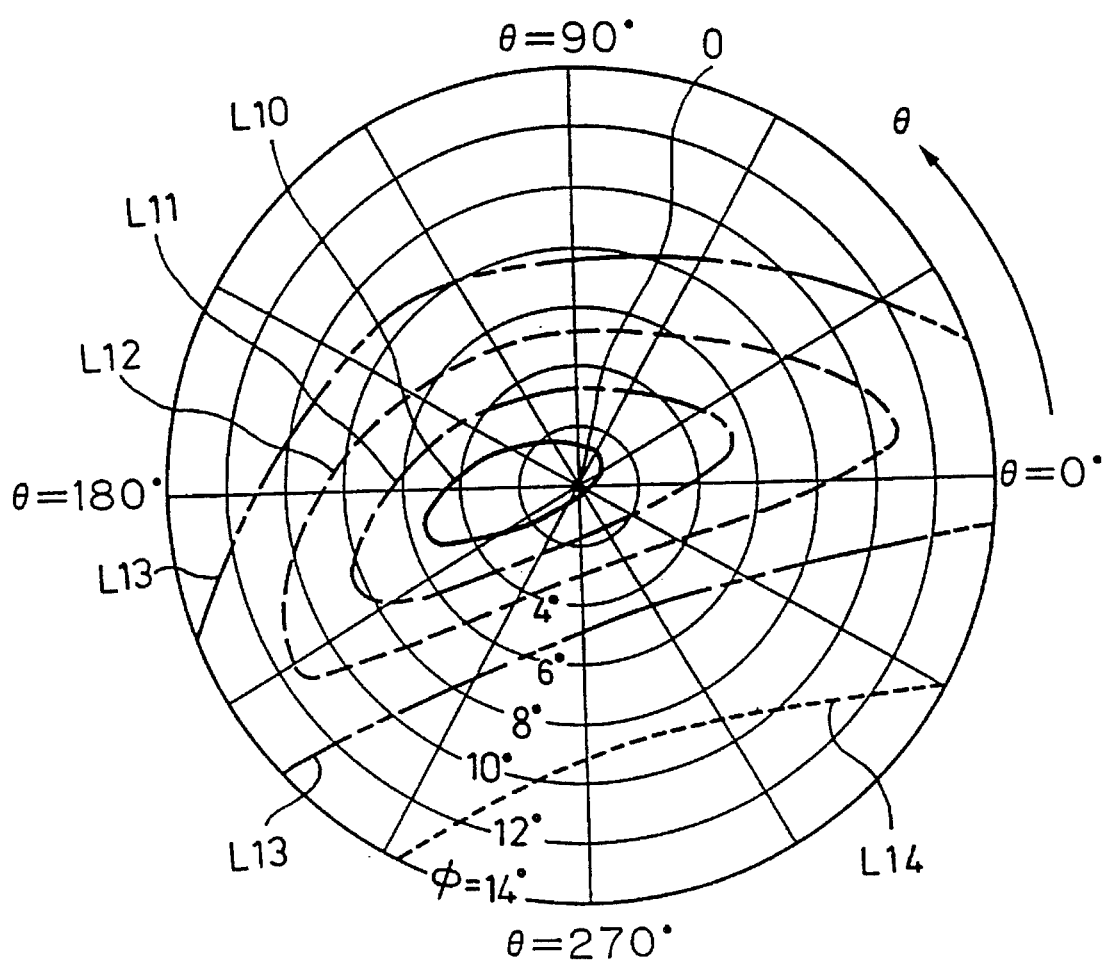
FIG. 16 is a characteristic diagram representing relation between the contrast and the viewing angle of the first embodiment of the liquid crystal light valve apparatus of projection type of the present invention.

Furthermore, the viewing angle dependence characteristic of contrast is measured in the above-mentioned phase. The measured viewing angle dependence characteristic is shown by isocontrast curves as shown in FIG. 16. Referring to FIG. 16, solid lines L1 are isocontrast lines of 900, chain lines L2 are isocontrast lines of 700, broken lines L3 are isocontrast lines of 500, chain double-dashed lines L4 are isocontrast lines of 300 and dotted line L5 is isocontrast line of 100, Therefore, the contrast is 900 or more in the area between both solid lines L1, and the contrast is larger than 700 and is smaller than 900 in both the areas between the solid line L1 and a neighboring chain line L2. In a similar manner, the contrast is 500–700 in both the areas between the chain line L2 and a neighboring broken line L3, and the contrast is 300–500 in both the areas between the broken lines L3 and a neighboring chain line L4. The contrast is 100–300 in the area between the chain line L4 and a dotted line L5. As shown in FIG. 16, the viewing angle dependence characteristic is approximately rotation symmetry with respect to the center of the circles representing the primary illumination ray ($\phi$=0, $\theta$=0). Consequently, the viewing angle dependence characteristic of contrast is improved in comparison with those of FIG. 5.

In the liquid crystal light valve apparatus of projection type using the above-mentioned liquid crystal light valve apparatus and the projection lens of F-number 4 as shown in FIG. 14, for example, a measured contrast is about 300 on the central part 107 of the screen 104. Consequently, contrast is increased from 200 to 300.

[OTHER EXAMPLE OF FIRST EMBODIMENT OF LIQUID CRYSTAL LIGHT VALVE APPARATUS OF PROJECTION TYPE]

Other example of the first embodiment of the liquid crystal light valve apparatus of projection type is described with reference to FIG. 14.

In the liquid crystal light valve apparatus 101, in the case that the retardations $\Gamma$ of the first and second phase difference plates 12 and 13 and the slant angle $\gamma$ of the second phase difference plate 13 are selected as described below, the contrast is further improved. In general, the light beams which are applied to the projection lens 103 form a shape of a circular cone of which the peak thereof is on the center of gravity 109 of the display area of the LC cell 14. The circular cone is rotation symmetry with respect to the primary illumination ray 108. For example, when the F-number of the projection lens 103 is 4, a converging angle (vertical angle of the circular cone) is about 7 degrees. In order to realize a high contrast on the image point 107 on the screen 104, an average contrast with respect to the light beams in the circular cone must be increased.

For this purposes, as a first condition, the phase difference of the primary illumination ray is compensated. Additionally, as a second condition, a light beam having a lowest contrast in the light beams of the circular cone is defined as a supplementary illumination ray, and the phase difference of the supplementary illumination ray is compensated. If the retardation $\Gamma$ and the slant angle $\gamma$ of the second phase difference plate 13 is selected so that both the first and second conditions are satisfied, the contrast is improved with respect to both the primary illumination ray 108 and the supplementary illumination ray. Consequently, a projection image improved in contrast is projected on the screen 104.

In an actual apparatus, for example, in the liquid crystal light valve apparatus 101 shown in FIG. 14, the viewing angle dependence characteristic of contrast is similar to that shown in FIG. 5 in the case of lack of the first phase difference plate 12 and the second phase difference plate 13, and a light beam of 7 degrees of elevation angle ($\phi$=7) and 270 degrees of azimuth ($\theta$=270) is designated as the supplementary illumination ray. Principle for compensating the phase difference of the supplementary illumination ray is identical with that of the primary illumination ray 108.

First, plural combinations of a retardation $\Gamma$ and a slant angle $\gamma$ are derived so that the phase difference is satisfactorily compensated with respect to the primary illumination ray 108. Subsequently, a combination of the retardation $\Gamma$ and the slant angle $\gamma$ is selected from the plural combinations so that the phase difference is satisfactorily compensated with respect to the supplementary illumination ray. The phase difference with respect to the supplementary illumination ray is not required to be correctly compensated.

[SECOND EXPERIMENT OF LIQUID CRYSTAL LIGHT VALVE APPARATUS]

In order to confirm effect of the above-mentioned liquid crystal light valve apparatus of projection type, the second experiment mentioned below is performed with reference to FIG. 10. In the second experiment, though the components and configuration of the liquid crystal light valve apparatus of projection type are identical with those of the first experiment, the retardations $\Gamma$ of the first phase difference plate 12 and the second phase difference plate 13 and the slant angle $\gamma$ of the second phase difference plate 13 are different from those of the first experiment. Furthermore, the method of measurement in the second experiment is also similar to that of the first experiment.

First, without the first phase difference plate 12 and the second phase difference plate 13, the primary illumination ray 108 and a supplementary illumination ray 21 are applied to the LC cell 14. The elevation angle $\phi$ and the azimuth $\theta$ of the supplementary illumination ray 21 are 7 degrees and 270 degrees, respectively ($\phi$=7, $\theta$=270). An intensity of light emitted from the outgoing side polarizing plate 15 is measured at a position in close proximity thereto, and the contrasts with respect to the black display state and the white display state are derived. Consequently, the contrast is about 600 with respect to the primary illumination ray 108, and is about 60 with respect to the supplementary illumination ray 21.

A retardation plate made of polycarbonate is used for the first phase difference plate 12 and the second phase difference plate 13. Several phase difference plates having different thicknesses D are prepared. The slant angle $\gamma$ of the second phase difference plate 13 is adjusted so that the light intensity of the primary illumination ray 108 becomes a minimum in the black display state. Consequently, even if the thickness D is changed and the retardation $\Gamma$ of the phase difference plate is changed, the phase difference is satisfactorily compensated with respect to the primary illumination ray 108.

Figure 17:
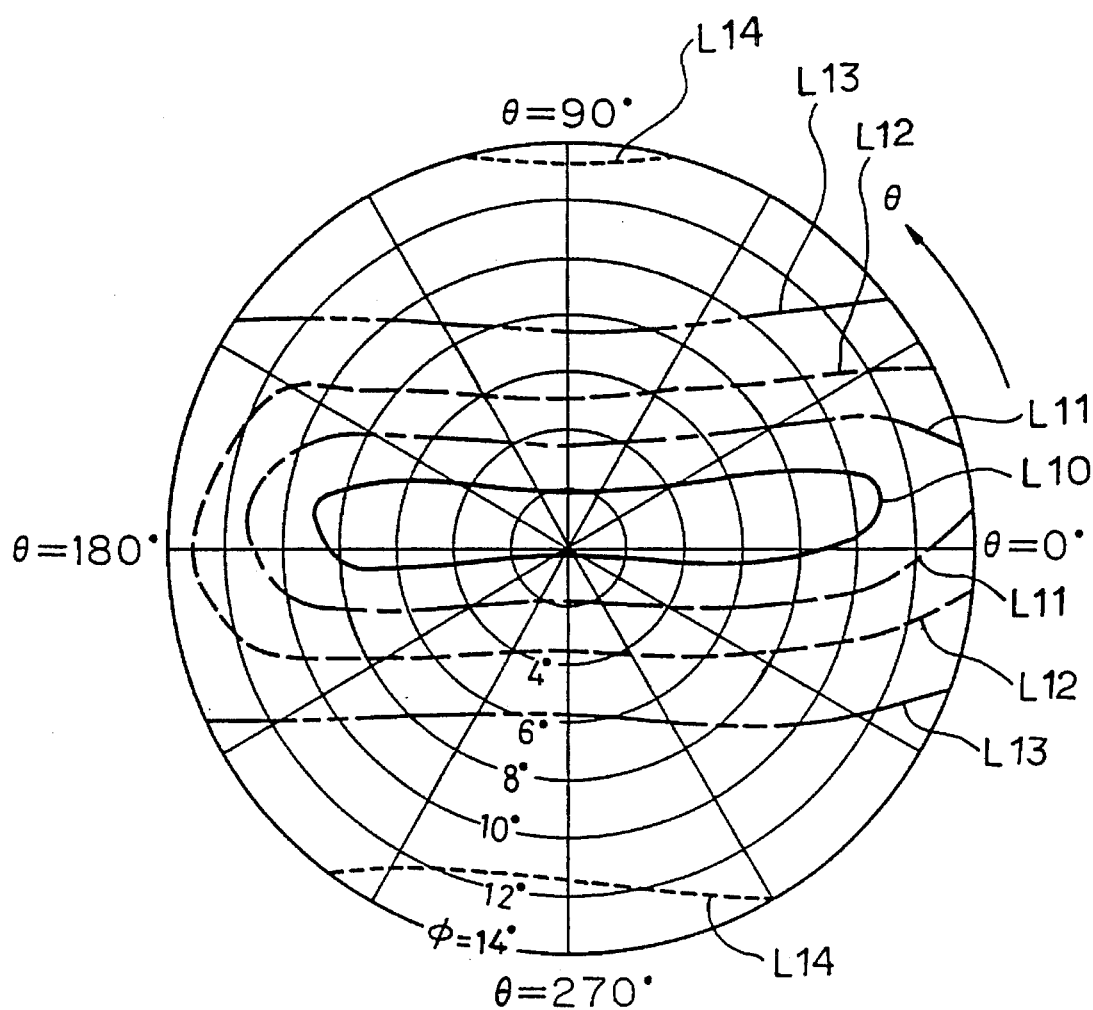
FIG. 17 is a characteristic diagram representing relation between the contrast and the viewing angle of the other example of the first embodiment of the liquid crystal light valve apparatus of projection type of the present invention.

Moreover, when the phase difference plate of 500 nm of retardation $\Gamma$ (at 540 nm of wavelength) is used, the contrast is improved to the maximum with respect to the supplementary illumination ray. In this case the second phase difference plate 13 is slanted by 7 degrees ($\gamma$=7) in the direction as shown in FIG. 10. Consequently, the contrast with respect to the primary illumination ray 108 increases from 600 to about 900, and the contrast with respect to the supplementary illumination ray increases from 60 to about 250. The viewing angle dependence characteristic of contrast in this case is shown in FIG. 17. Referring to FIG. 17, solid lines L1 are isocontrast lines of 900, chain lines L2 are isocontrast lines of 700, broken lines L3 are isocontrast lines of 500, chain double-dashed lines L4 are isocontrast lines of 300 and dotted line L5 is isocontrast line of 100. Therefore, the contrast is 900 or more in the area between both solid lines L1, and the contrast is larger than 700 and is smaller than 900 in both the areas between the solid line L1 and a neighboring chain line L2. In a similar manner, the contrast is 500–700 in both the areas between the chain line L2 and a neighboring broken line L3, and the contrast is 300–500 in both the areas between the broken lines L3 and a neighboring chain line L4. The contrast is 100–300 in the area between the chain line L4 and a dotted line L5. As shown in FIG. 17, the viewing angle dependence characteristic maintains satisfactory symmetricalness with respect to the direction of the primary illumination ray 108.

Subsequently, the liquid crystal light valve apparatus of projection type as shown in FIG. 14 is structured by using the above-mentioned liquid crystal light valve apparatus and a projection lens having 4 of F-number. Consequently, the contrast 200 at the center of gravity 107 of the screen 104 is improved and becomes about 400.

The contrast is about 150 with respect to the supplementary illumination ray in the first experiment. Therefore, the contrast with respect to the supplementary illumination ray is greatly improved by the configuration of the second experiment in comparison with the first experiment. The viewing angle dependence characteristic of contrast shown in FIG. 17 is also greatly improved in comparison with the viewing angle dependence characteristic of contrast shown in FIG. 16. Consequently, a monochromatic optical image having high contrast is realizable, and the contrast is also improved in the projected image.

[FOURTH EMBODIMENT OF LIQUID CRYSTAL LIGHT VALVE APPARATUS]

Figure 18:
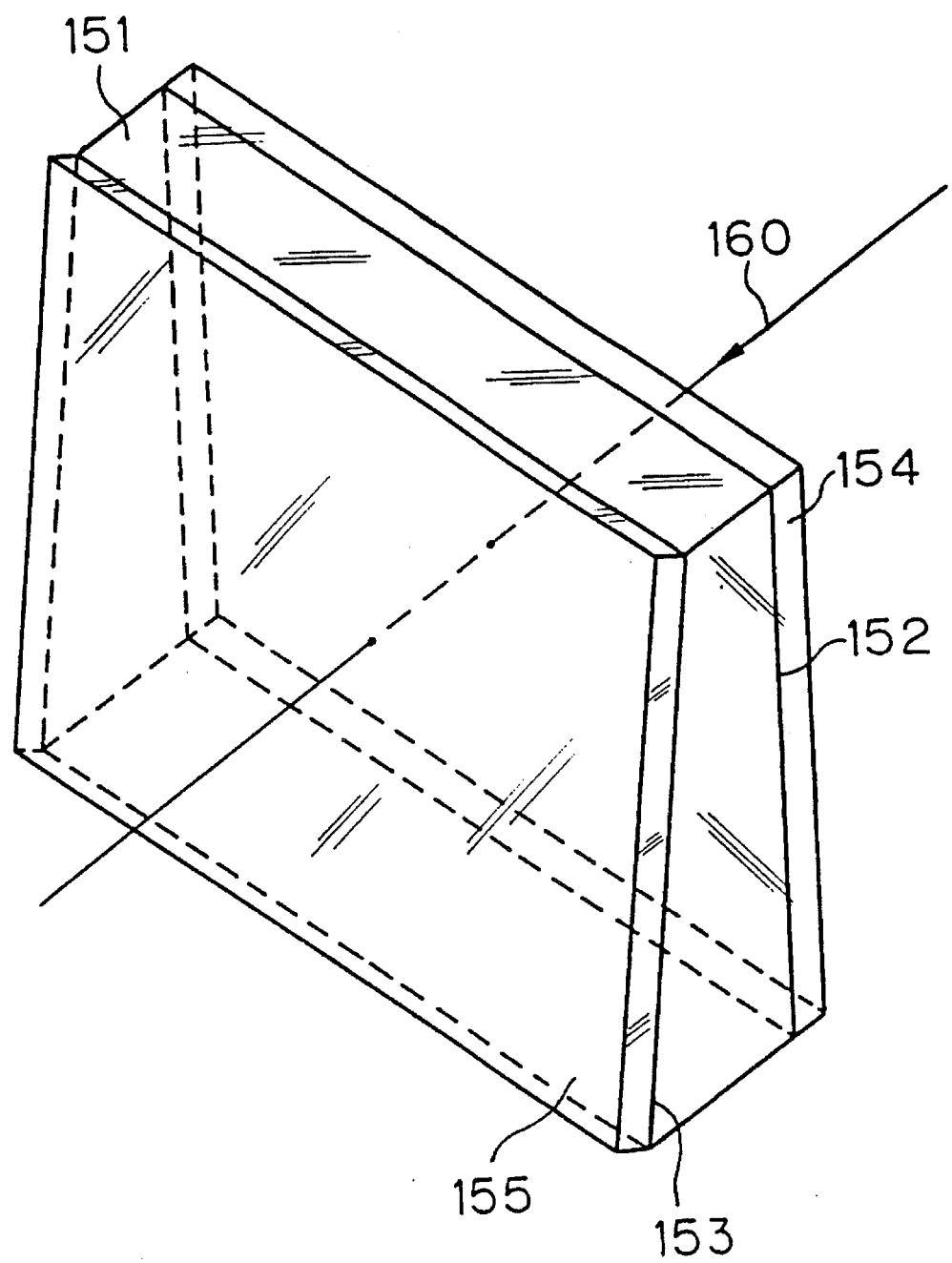
FIG. 18 is a perspective view of a transparent body holding the phase difference plates of the liquid crystal light valve apparatus of the present invention.

FIG. 18 is a perspective view illustrating structure of the first phase difference plate and the second phase difference plate in the fourth embodiment of the present invention. Remaining elements of the liquid crystal light valve apparatus are similar to those of the previous embodiments, and the illustration is omitted.

In the fourth embodiment, a first phase difference plate 154 and a second phase difference plate 155 are adhered on a transparent member 151 as shown in FIG. 18. The transparent member 151 is made of glass or transparent plastic such as acryl resin, and the first phase difference plate 154 is adhered on a surface 152 and the second phase difference plate 155 is adhered on a surface 153 of the transparent member 151. In an actual configuration, a film-like retardation plate made by stretching transparent plastic resin is adhered by adhering substance. The surface 152 of the transparent member 151 is perpendicularly arranged to the primary illumination ray 160, and the surface 153 of the transparent member 151 is slanted to the surface 152. The slant angle of the surface 153 is substantially equal to the slant angle $\gamma$ as described in the previous embodiments. According to the fourth embodiment, since first phase difference plate 154 and the second phase difference plate 155 are held by the transparent member 151, the first and second phase difference plates 154 and 155 are correctly positioned in the liquid crystal light valve apparatus. Moreover, boundary faces between air and an optical members are reduced, and undesirable reflection may be decreased. In the embodiment shown in FIG. 18, the boundary face is reduced from four to two.

Figure 19:
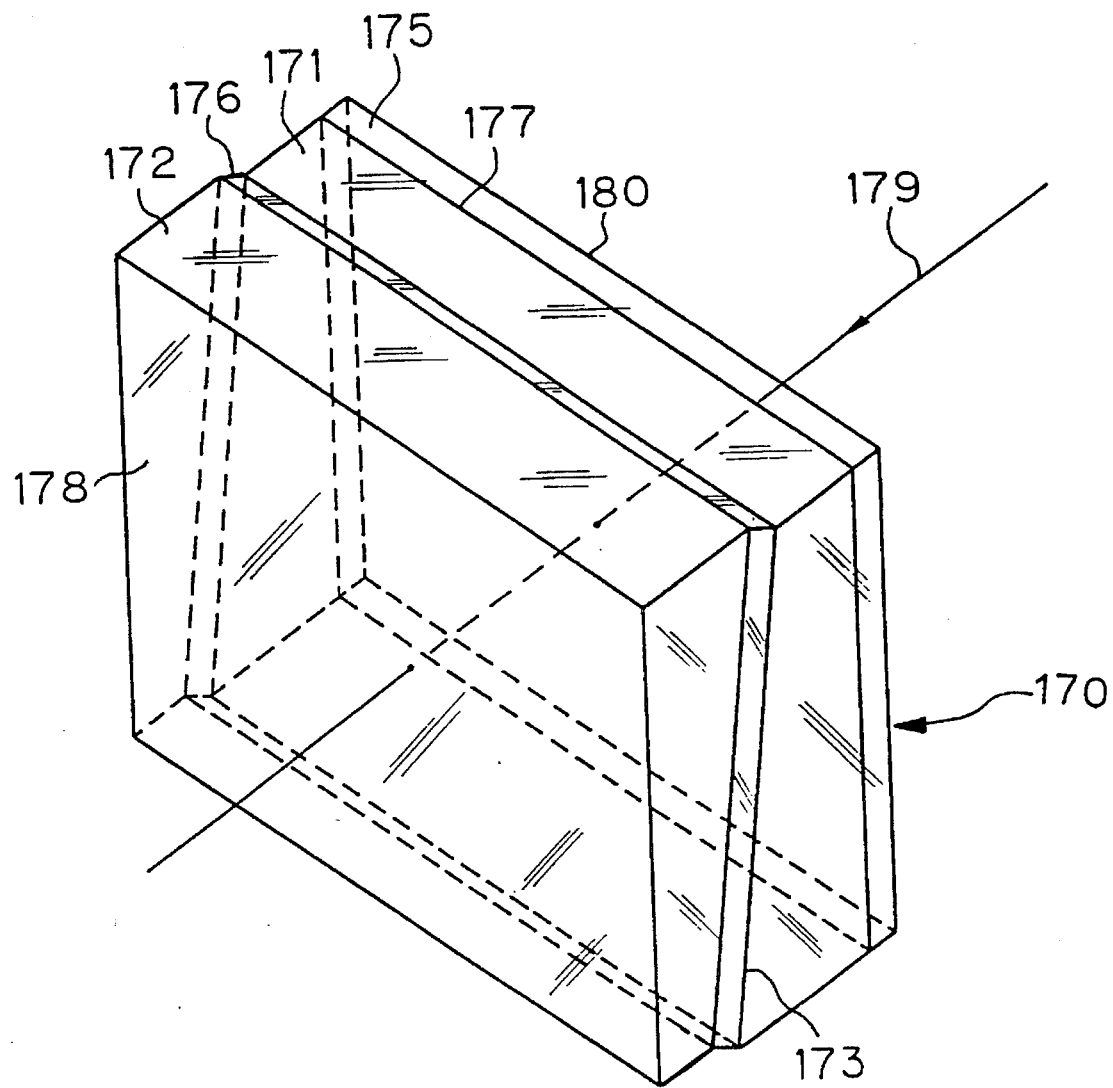
FIG. 19 is a perspective view of another transparent body holding the phased difference plates of the liquid crystal light valve apparatus of the present invention.

FIG. 19 is a perspective view illustrating other example of the fourth embodiment. In the example, a transparent member 170 is composed of a first transparent member 171 and a second transparent member 172. The transparent members 171 and 172 may be made by dividing a rectangular solid along a slanted surface 173, for example. The first phase difference plate 175 is adhered on a surface 177 of the transparent member 171, and the second phase difference plate 176 is sandwiched between the transparent member 171 and the transparent member 172. For example, adhering substance is coated on both the surfaces of a film-like retardation plate, and the film-like retardation plate is sandwiched between the surfaces 173 and 174 to assembly the transparent members 171 and 172.

Figure 20:
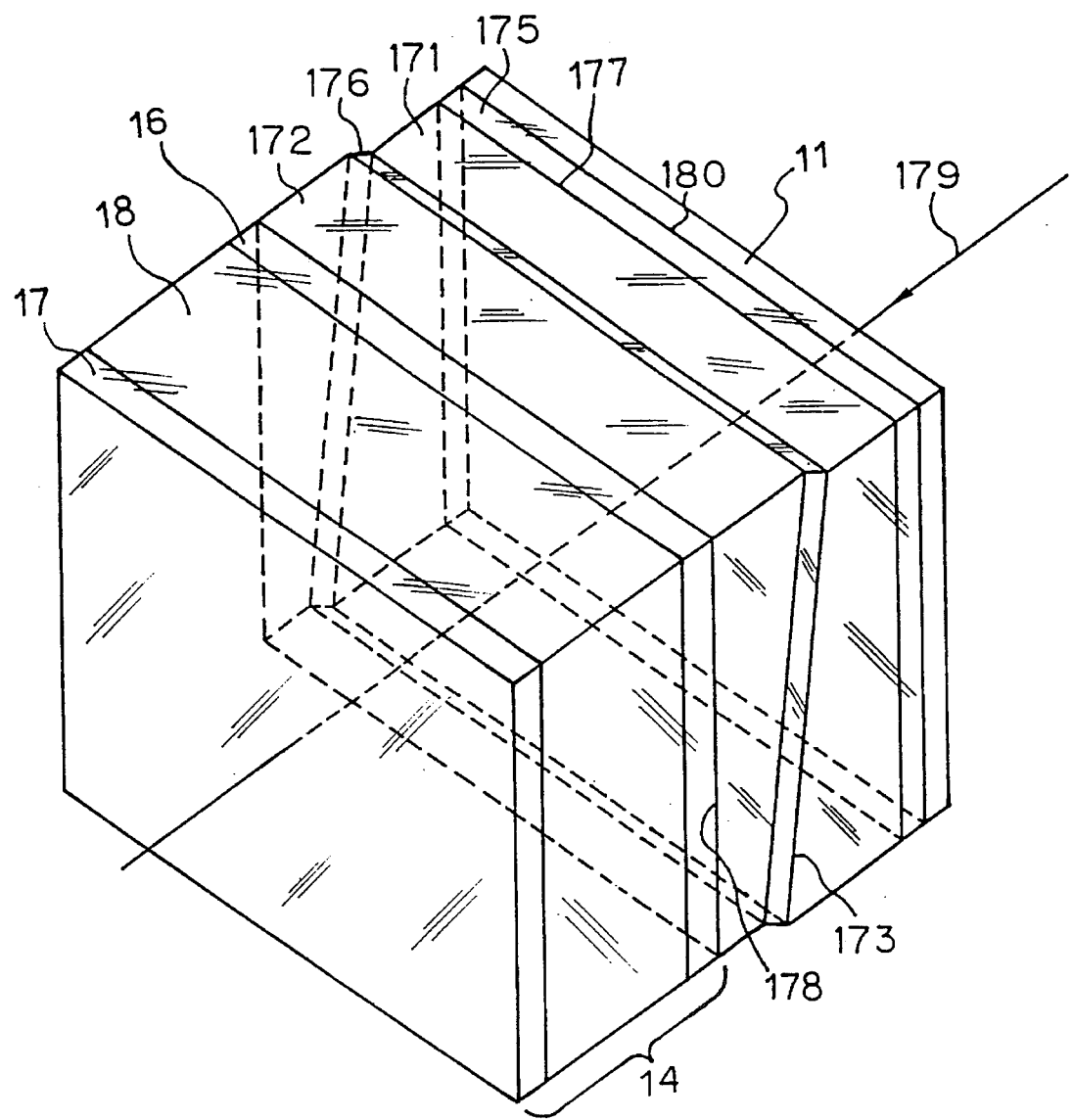
FIG. 20 is a perspective view of another transparent body holding the phase difference plates of the liquid crystal light valve apparatus of the present invention.

The surface 177 is arranged perpendicularly to the primary illumination ray 179. The surface 173 is arranged to meet the slant direction and slant angle of the second phase difference plate as mentioned in the previous embodiments. The surface 177 is parallel to the surface 178, and the surface 178 is arranged in parallel to a LC cell (not shown). Moreover. In order to form optical coupling as described in the second embodiment and shown in FIG. 10, as shown in FIG. 20, the incident side polarizing plate 11 is adhered on a surface 180 of the first phase difference plate 175, and the LC cell 14 is adhered on the surface 178 of the second transparent member 172.

In the embodiments of the liquid crystal light valve apparatus of the present invention, though the light passing along the normal line of the LC cell is defined as the primary illumination ray, a light passing with a predetermined angle to the normal line of the LC cell may be defined as the primary illumination ray. In this case, a transparent member 190 shown in FIG. 21 is usable instead of the transparent member 170 shown in FIG. 19.

Figure 21:
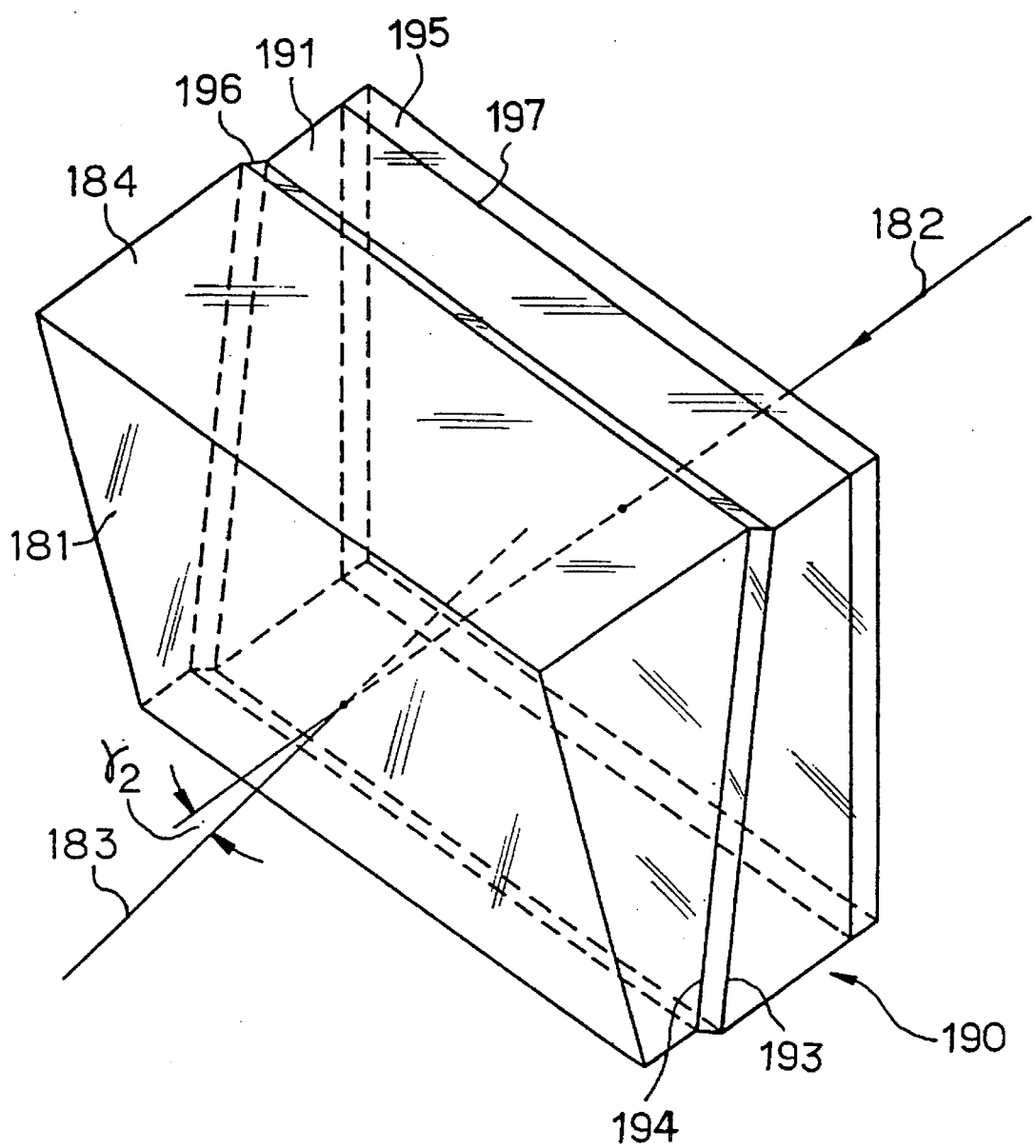
FIG. 21 is a perspective view of further transparent body holding the phase difference plate of the liquid crystal light valve apparatus of the present invention.

In FIG. 21, the transparent member 190 is composed of a first transparent member 184 and a second transparent member 191, and a second phase difference plate 196 is sandwiched between the surface 194 of the transparent member 184 and the surface 193 of the transparent member 191. The first phase difference plate 195 is adhered on the other surface 197 of the transparent member 191. Another surface 181 of the transparent member 184 is slanted with respect to the surface 197 of the transparent member 191, and the normal line 183 of the surface 181 is slanted by an angle $\gamma_2$ with respect to the primary illumination ray 182 which is perpendicular to the surface 197. Symmetricalness of a light passing in parallel to the primary illumination ray 182 in the air with respect to the primary illumination ray 182 is maintained in medium of optical coupling. The symmetricalness is also maintained with respect to the phase difference given by the first phase difference plate 195 and the second phase difference plate 196 and the phase difference given by the LC cell. Consequently, the viewing angle dependence characteristic of phase difference given by LC cell in the black display state is satisfactorily correlated with the view angle dependence characteristic of phase difference given by the first and second phase difference plates 195 and 196.

In the embodiments of the liquid crystal light valve apparatus and the liquid crystal light valve apparatus of projection type in accordance with the present invention, the retardations $\Gamma$ of the first phase difference plate and the second phase difference plate may be in the range of 100 nm–1000 nm with respect to the light of 540 nm of wavelength having a high spectral luminous efficacy.

In the case that the retardation $\Gamma$ is lower than 100 nm, the slanted angle of the phase difference plate increases. Consequently, an optical path occupied by the slanted phase difference plate increases, and a size in the direction of the optical path of the liquid crystal light valve apparatus increases. Moreover, the contrast is not satisfactorily improved in a reasonable range of the slant angle.

In the case that a phase difference plate of a retardation $\Gamma$ exceeding 1000 nm is used, a slant angle of the phase difference plate decreases. Consequently, the phase difference due to phase difference plate widely varies by a small change of the slant angle, and hence adjustment operation of the slant angle is not easy. Moreover, a large compensation error of the phase difference arises by a small deviation of characteristics and displacement of an optical element, and the contrast is not satisfactorily improved. For example, in the liquid crystal light valve apparatus as shown in FIG. 10, in order to compensate a phase difference of an elliptically polarized light of about one degree of ellipticity angle $\beta$ ($\beta=1$), the second phase difference plate 13 must be slanted by 15 degrees or more in the case that the retardation $\Gamma$ of the second phase difference plate 13 is smaller than 100 nm. If the second phase difference plate is slanted by such a large angle, a stray light increases and the contrast is not satisfactorily improved. In the case that the retardation $\Gamma$ of the phase difference plate exceeds 1000 nm, the slant angle of the second phase difference plate is four degrees and below. However, the contrast is not satisfactorily improved by the slant angle of four degrees and below.

Configuration of an actual liquid crystal light valve apparatus and a liquid crystal light valve apparatus of projection type of the embodiments is described hereafter.

In adjustment operation of the liquid crystal light valve apparatus of the embodiments, the slant angle of one of the first phase difference plate 12 and the second phase difference plate 13 must be changed so that an intensity of the outgoing light from the liquid crystal light valve apparatus becomes a minimum in the black display state. In order to allow adjustment, the first phase difference plate 12 and the second phase difference plate 13 are independently supported of the incident side polarizing plate 11, the LC cell 14 and the outgoing side polarizing plate 15.

As shown in FIG. 10, in the case that optical path between the incident side polarizing plate 11 and the LC cell 14 is formed by the optical coupling, use of transparent liquid or gel-like silicone rubber is recommendable to fill the optical path. The arrangements of the first phase difference plates 12 and the second phase difference plates 13 are freely adjustable after filling of the transparent liquid.

In the case of the gel-like silicone rubber, even if deformation is given to the gel-like silicone rubber, occurrence of exfoliation or crack in the gel-like silicone rubber is prevented within a slight deformation thereof. Therefore, the arrangement of the first and second phase difference plates 12 and 13 is finely adjustable after filling the gel-like silicone rubber. Moreover, birefringence hardly occurs in the optical path.

In the above-mentioned embodiments of the present invention, though the phase difference is compensated by slanting the second phase difference plate 13 located adjacent to the LC cell 14, a similar result is attainable by exchanging the first phase difference plate 12 located adjacent to the incident side polarizing plate 11 for the second phase difference plate 13. Moreover, the similar result is attainable by slanting both the first and second phase difference plates 12 and 13.

Furthermore, both the first and second phase difference plates 12 and 13 may be located between the LC cell 14 and the outgoing side polarizing plate 15, and thereby the contrast may be improved. In an actual apparatus, it is preferable that the first and the second phase difference plates 12 and 13 are located between the LC cell 14 and the incident side polarizing plate 11. If the first and the second phase difference plates 12 and 13 are located between the LC cell 14 and the outgoing side polarizing plate 15, an optical image produced by the LC cell 14 is liable to be distorted by refraction or irregular reflection on the boundary faces of these phase difference plates 12, 13 and transparent members for supporting them. Consequently, the projection image on the screen is defocused. Moreover, a stray light produced by undesirable reflection on boundary faces gives harmful influence to the image quality of the projected image.

Transparent resins described below are usable for the first and the second phase difference plates 12 and 13 by stretching them.

For example, the resins which are similar to a uniaxial crystal are as follows: polycarbonate, polyvinyl alcohol (PVA), polyether sulfone (PES), polyvinylidene fluoride and polyethylene terephthalate. The resins which are similar to a negative uniaxial crystal are as follows: polystyrene and polymethyl methacrylate, for example.

The first phase difference plate 12 and the second phase difference plate 13 are not necessary to be made of the same material. Even if the materials are different, if the retardation $\Gamma$ of both the first and second phase difference plates are equal, desired result is attainable. In the above-mentioned case, a wavelength band which is wider than a desired wavelength band may be set by considering wavelength dependent characteristics of the LC cell 14 and the first and second phase difference plates 12 and 13. An adequate combination of the materials is selected so as to satisfactorily compensate the phase difference with respect to a light in the wavelength band.

On the other hand, when the first and the second phase difference plates are perpendicularly arranged to the primary illumination ray and the optical axis of the first phase difference plate is perpendicular to the optical axis of the second phase difference plate, it is desirable that the first and the second phase difference plates never give a phase difference to the primary illumination ray. For this purposes, it is desirable that characteristics of both the first and the second phase difference plates are in coincidence. The phase difference plates having the same characteristics may be attained by using the phase difference plates made of the same material and design and the same fabricating process.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A liquid crystal light valve apparatus comprising:

an incident side linear polarizing means for transmitting a linearly polarized light having a first polarization axis in a first predetermined direction, a liquid crystal cell comprising incident side and outgoing side transparent substrate and twisted nematic liquid crystal with a twist angle of about 90 degrees therebetween, an outgoing side linear polarizing means for transmitting a linearly polarized light having a second polarization axis in a second predetermined direction, and first and second phase difference means each having a function similar to a positive or negative uniaxial crystal, both disposed between said incident side polarizing means and said liquid crystal cell or between said liquid crystal cell and said outgoing side polarizing means, the direction of the polarization axis of said incident side polarizing means being either parallel or perpendicular to the major axis direction of the liquid crystal molecules contacting said incident side transparent substrate, a primary illumination ray defined as a main light beam of a predetermined wavelength which is representative of illumination light for illuminating said liquid crystal cell, said first and second polarizing axes, an optical axis of said first phase difference means and an optical axis of said second phase difference means having first, second, third and fourth projections respectively in a plane perpendicular to said primary illumination ray, said first and second projections and said third and fourth projections being substantially orthogonal and said first and third projections forming an angle of about 45 degrees, first and second angles $\phi_1$ and $\phi_2$ defined as the angles between said optical axes of said first and second phase difference means respectively and a plane perpendicular to said primary illumination ray, said first phase difference means and said second phase difference means giving phase differences which are equal in magnitude and opposite in sign to said primary illumination ray when said first and second angles each equal zero degrees, one of said first angle and said second angle being predetermined in a manner such that light intensity of said primary illumination ray passing through said outgoing side polarizing means is minimum when the liquid crystal cell is in the darkest state.

2. A liquid crystal light valve apparatus in accordance with claim 1, wherein said first and second phase difference means are comprised of identical retardation plates wherein they have a combined function similar to a positive uniaxial crystal, and in the case that the wavelength of said primary illumination ray is designated by λ, and in said first phase difference means and said second phase difference means, a refractive index in the direction of said optical axis with respect to the light of wavelength λ is designated by $N_s$, a refractive index in the direction perpendicular to said optical axis is designated by $N_f$, a thickness of said first phase difference means and said second phase difference means in the direction perpendicular to said optical axis is designated by D and a constant K is defined by a ratio of $N_f$ to $N_s$ ($K=N_f/N_s$), and a phase difference of said primary illumination ray which is given by said liquid crystal light cell driven to form a darkest optical image is designated by $\delta_0$, and said phase difference $\delta_0$ is defined as a lead of the phase of a polarization component in the direction of said fourth projection to a polarization component in the direction of said third projection, directions of said optical axes of first and second phase difference means being selected so that said phase difference $\delta_0$, is a negative value, and said first phase difference means is arranged so that said first angle represented by $\phi_1$ is substantially zero degrees, and said second phase difference means is arranged so that said second angle represented by $\phi_2$ satisfies equation (20), $$1 - K + \frac{K}{\cos\phi_2} - \frac{1}{\cos\phi_2} \times \frac{K}{\sqrt{\sin^2\phi_2 + K^2\cos^2\phi_2}} = -\frac{\lambda\delta_0}{2\pi D N_s} \quad (20)$$

3. A liquid crystal light valve apparatus in accordance with claim 1, wherein said first and second phase difference means are each comprised of an identical retardation plate wherein they have a combined function similar to a negative uniaxial crystal, and the wavelength of said primary illumination ray is designated by λ, and in said first phase difference means and said second phase difference means, a refractive index in the direction of the optical axis in the light of wavelength λ is designated by $N_f$, a refractive index in the direction perpendicular to said optical axis is designated by $N_s$, a thickness in the direction perpendicular to said optical axis is designated by D, a constant K' is equal to a ratio of $N_s$ to $N_f$ ($N_s/N_f$) and a phase difference of said primary illumination ray given by said liquid crystal cell driven to form a darkest optical image is given by $\delta_0$ (radian), and said phase difference $\delta_0$ is defined as a lead of phase of a polarization component in the direction of said third projection to a polarization component in the direction of said fourth projection, directions of said optical axes of said first and second phase difference means being selected so that said phase difference $\delta_0$ is a negative value, said first phase difference means is arranged so that said first angle $\phi_1$ becomes about zero degrees, and said second phase difference means is arranged so that said second angle $\phi_2$ satisfies equation (21), $$K' - 1 - \frac{K'}{\cos\phi_2} + \frac{1}{\cos\phi_2} \times \frac{K'}{\sqrt{\sin^2\phi_2 + K'^2\cos^2\phi_2}} = -\frac{\lambda\delta_0}{2\pi D N_f} \quad (21)$$

4. A liquid crystal light valve apparatus in accordance with claim 1, wherein said first and second phase difference means are each comprised of an identical retardation plate wherein they have a combined function similar to a positive uniaxial crystal, and liquid crystal moleculars are located in a central part of a liquid crystal layer in said liquid crystal cell, an angle between the major axis direction of said liquid crystal molecular and said optical axis of said first phase difference means and an angle between said major axis direction of said liquid crystal molecular and said optical axis of said second phase difference means are substantially 90 degrees when the liquid crystal cell is in the darkest state.

5. A liquid crystal light valve apparatus in accordance with claim 1, wherein said first and second phase difference means are each comprised of an identical retardation plate wherein they have a combined function similar to a positive uniaxial crystal, and at a point which is representative of a display area of said liquid crystal cell driven to form a darkest optical image, a supplementary illumination ray is defined as a light beam given a largest phase difference by said liquid crystal cell in effective light beams intersecting said primary illumination ray with a predetermined angle at said point and having the same wavelength as said primary illumination ray, retardations defined as the product of a refractive index by a thickness of said first phase difference means and said second phase difference means are selected so that a light intensity of said supplementary illumination ray passing through said outgoing side polarizing means becomes a minimum when the liquid crystal cell is in the darkest state.

6. A liquid crystal light valve apparatus in accordance with claim 5, wherein said retardation is defined as a difference of an optical path length which is given to a light beam of 540 nm of wavelength passing perpendicularly to said optical axis, and said retardation of said first phase difference means and said second phase difference means is 100 nm or more and is 1000 nm and below.

7. A liquid crystal light valve apparatus in accordance with claim 1, wherein at least one of said first phase difference means and said second phase difference means is located apart from said liquid crystal cell, said incident side polarizing means and said outgoing side polarizing means, and at least one of said first angle $\phi_1$ and said second angle $\phi_2$ is variable.

8. A liquid crystal light valve apparatus in accordance with claim 1, wherein said first phase difference means and said second phase difference means are comprised of a film-like retardation plate which is made by stretching transparent resin.

9. A liquid crystal light valve apparatus in accordance with claim 1, wherein said first phase difference means and said second phase difference means are arranged in an optical path between said incident side polarizing means and said liquid crystal cell.

10. A liquid crystal light valve apparatus in accordance with claim 1, wherein said first phase difference means and said second phase difference means are each comprised of a retardation plate fabricated on the basis of the same specification, design and fabricating process and is selected from the same fabrication lot.

11. A liquid crystal light valve apparatus in accordance with claim 1, wherein an optical path including said first phase difference means and said second phase difference means is provided between said incident side polarizing means and said liquid crystal cell or between said liquid crystal cell and said outgoing side polarizing means, said path being filled with transparent material to form an optical coupling.

12. A liquid crystal light valve apparatus in accordance with claim 11, wherein said transparent material is gel-like silicone resin.

13. A liquid crystal light valve apparatus in accordance with claim 1, wherein said first phase difference means and said second phase difference means are mounted on a pair of opposed surfaces of a transparent member on which one of said pair of surfaces is slanted by a predetermined angle in a predetermined direction to the other surface, and the optical path between said first phase difference means and said second phase difference means is formed by an optical coupling.

14. A liquid crystal light valve apparatus in accordance with claim 1, further comprising:

a first solid transparent member having first and second opposing surfaces, a second solid transparent member having third and fourth opposing surfaces and said first transparent member, said second transparent member, said liquid crystal cell, said first phase difference means and said second phase difference means are optically coupled by arranging in the order of said incident side transparent substrate of said liquid crystal cell, said first surface, said first transparent member, said second surface, one of said first phase difference means and said second phase difference means, said third surface, said second transparent member, said fourth surface, the other of said first phase difference means and said second phase difference means, and at least one of said first surface, second surface, third surface and fourth surface is slanted by a predetermined angle in a predetermined direction with respect to a surface of said liquid crystal cell.

15. A liquid crystal light valve apparatus in accordance with claim 1, wherein said first phase difference means and said second phase difference means are located between said liquid crystal cell and said incident side polarizing means, an optical coupling is formed between said liquid crystal cell and said incident side polarizing means, and a boundary face of said incident side of said optical coupling is substantially perpendicular to said primary illumination ray.

16. A liquid crystal light valve apparatus of projection type comprising:

a light source for emitting an illumination light, a liquid crystal light valve apparatus for modulating said illumination light and forming an optical image, a projection lens for projecting said optical image on a screen, and a primary illumination ray defined as a main light having a predetermined wavelength which is representative of said illumination light, and said primary illumination ray emitted from said light source passes adjacent to the center of gravity of an effective display area of said liquid crystal light valve apparatus and adjacent to the center of gravity of an entrance pupil of said projection lens and is projected on said screen, and said liquid crystal light valve apparatus comprises an incident side polarizing means for transmitting a linearly polarized light having a first polarization axis in a first direction, a liquid crystal cell comprising incident side and outgoing side transparent substrates having twisted nematic liquid crystal with a twist angle of about 90 degrees therebetween, an outgoing side linear polarizing means for transmitting a linearly polarized light having a second polarization axis in a second predetermined direction, first and second phase difference means each having a function similar to a positive or negative uniaxial crystal, both disposed between said incident side polarizing means and said liquid crystal cell or between said liquid crystal cell and said outgoing side polarizing means, the direction of the polarization axis of said incident side polarizing means being either parallel or perpendicular to the major axis direction of liquid crystal moleculars contacting said incident side transparent substrate, said first and second polarizing axes, an optical axis of said first phase difference means and an optical axis of said second phase difference means having first, second, third and fourth projections, respectively in a plane perpendicular to said primary illumination ray, said first and second projections and said third and fourth projections being substantially orthogonal and said first and third projections forming an angle of about 45 degrees, first and second angles $\phi_1$ and $\phi_2$ defined as the angles between said optical axes of said first and second phase difference means respectively, and a plane perpendicular to said primary illumination ray, said first phase difference means and said second phase difference means giving phase differences which are equal in magnitude and opposite in sign to said primary illumination ray when said first and second angles each equal zero degrees, one of said first angle and said second angle being predetermined in a manner such that light intensity of said primary illumination ray passing through said outgoing side polarizing means becomes a minimum when the liquid crystal cell is in the darkest state.

17. A liquid crystal light valve apparatus of projection type in accordance with claim 16, wherein said projection lens is formed in a manner that light beams emitted from an effective display area of said liquid crystal light valve apparatus and applied to the center of gravity of said entrance pupil of said projection lens are substantially parallel to said primary illumination ray in the vicinity of the outgoing side of said liquid crystal light valve apparatus.

18. A liquid crystal light valve apparatus of a projection type comprising:

a light source for emitting illumination light including color components of three primary colors, color separating means for separating said illumination light emitted from said light source to illumination lights of three primary colors, three liquid crystal light valve apparatuses for forming three optical images corresponding to said three primary colors by modulating said illumination lights of said three primary colors emitted from said color separating means, color combining means for combining said illumination lights of said three primary colors emitted from said three liquid crystal light valve apparatus to one illumination light, a projection lens for projecting said illumination light emitted from said color combining means on a screen, and a primary illumination ray defined as a main light having a predetermined wavelength which is representative of said illumination ray corresponding to said three liquid crystal light valve apparatuses, said three liquid crystal light valve apparatuses each comprise an incident side polarizing means for transmitting a linearly polarized light having a first polarization axis in a first direction, a liquid crystal cell comprising incident side and outgoing side transparent substrates having twisted nematic liquid crystal with a twist angle of about 90 degrees therebetween, an outgoing side linear polarizing means for transmitting a linearly polarized light having a second polarization axis in a second predetermined direction, first and second phase difference means each having a function similar to a positive or negative uniaxial crystal, both disposed between said incident side polarizing means and said liquid crystal display cell or between said liquid crystal display cell and said outgoing side polarizing means, the direction of the polarization axis of said incident side polarizing means being either parallel or perpendicular to the major axis direction of liquid crystal moleculars contacting said incident side transparent substrate, said first and second polarizing axes, an optical axis of said first phase difference means and an optical axis of said second phase difference means having first, second, third and fourth projections, respectively in a plane perpendicular to said primary illumination ray, said first and second projections and said third and fourth projections being substantially orthogonal and said first and third projections forming an angle of about 45 degrees, first and second angles $\phi_1$ and $\phi_2$ defined as the angles between said optical axes of said first and second phase difference means, respectively and a plane perpendicular to said primary illumination ray, said first phase difference means and said second phase difference means giving phase differences which are equal in magnitude and opposite in sign to said primary illumination ray when said first and second angles each equal zero degrees, one of said first angle and said second angle being predetermined in a manner such that light intensity of said primary illumination ray passing through said outgoing said polarizing means becomes a minimum when the liquid crystal cell is in a darkest state.

19. A liquid crystal light valve apparatus of projection type in accordance with claim 18, wherein said projection lens is formed in a manner that light beams emitted from respective effective display areas of said liquid crystal light valve apparatus and applied to the center of gravity of said entrance pupil of said projection lens are substantially parallel to said respective primary illumination rays in the vicinity of the outgoing sides of said liquid crystal light valve apparatus.

20. A liquid crystal light valve apparatus of a projection type comprising:

a light source for emitting an illumination light having means for moving said light source in an arbitrary direction, a liquid crystal valve apparatus for forming optical images by modulating said illumination light, a projection lens for projecting said optical image on a screen, means for parallelly moving said projection lens in the direction perpendicular to said optical axis, and a primary illumination ray defined as a light which passes in the vicinity of the center of gravity of said effective display area of said liquid crystal light valve apparatus and applied to the center of gravity of an entrance pupil of said projection lens, said liquid crystal light valve apparatus comprises an incident side polarizing means for transmitting a linearly polarized light having a first polarization axis in a first direction, a liquid crystal cell comprising incident and outgoing side transparent substrates having twisted nematic liquid crystal with a twist angle of about 90 degrees therebetween, an outgoing side linear polarizing means for transmitting a linearly polarized light having a second polarization axis in a second predetermined direction, first and second phase difference means each having a function similar to a positive or negative uniaxial crystal, both disposed between said incident side polarizing means and said liquid crystal cell or between said liquid crystal cell and said outgoing side polarizing means, the direction of the polarization axis of said incident said polarizing means being either parallel or perpendicular to the major axis direction of liquid crystal moleculars contacting said incident side transparent substrate, said first and second polarizing axes, an optical axis of said first phase difference means and an optical axis of said second phase difference means having first, second, third and fourth projections respectively in a plane perpendicular to said primary illumination ray, said first and second projections and said third and fourth projections being substantially orthogonal and said first and third projections forming an angle of about 45 degrees, first and second angles $\phi_1$ and $\phi_2$ defined as the angles between said optical axes of said first and second phase difference means respectively and a plane perpendicular to said primary illumination ray, said first phase difference means and said second phase difference means giving phase differences which are equal in magnitude and opposite in sign to said primary illumination ray when said first and second angles each equal zero, one of said first angle and said second angle being predetermined in a manner such that light intensity of said primary illumination ray passing said outgoing side polarizing means becomes a minimum when the liquid crystal cell is in a darkest state.

* * * * *